(12) United States Patent (10) Patent No.: US 9,269,012 B2
Fotland (45) Date of Patent: Feb. 23, 2016

(54) MULTI-TRACKER OBJECT TRACKING

(71) Applicant: Amazon Technologies, Inc., Reno, NV (US)

(72) Inventor: David Allen Fotland, San Jose, CA (US)

(73) Assignee: Amazon Technologies, Inc., Reno, NV (US)

( * ) Notice: Subject to any disclaimer, the term of this patent is extended or adjusted under 35 U.S.C. 154(b) by 147 days.

(21) Appl. No.: 13/973,913

(22) Filed: Aug. 22, 2013

(65) Prior Publication Data

US 2015/0055821 A1    Feb. 26, 2015

(51) Int. Cl.
 *G06K 9/32* (2006.01)
 *G06K 9/00* (2006.01)
 *G06T 7/20* (2006.01)

(52) U.S. Cl.
 CPC .......... *G06K 9/3241* (2013.01); *G06K 9/00228* (2013.01); *G06K 9/00369* (2013.01); *G06T 7/2033* (2013.01); *G06K 2009/3291* (2013.01); *G06T 2207/10016* (2013.01); *G06T 2207/30201* (2013.01)

(58) Field of Classification Search
 CPC ......... G06F 3/013; G06F 3/011; G06F 3/017; G06F 1/1626; G06F 2200/1637; G06F 3/012; G06F 3/04815; G06F 3/0346; G06F 2203/04802; G06F 1/1686; G06K 9/00597; G06K 9/0061; G06K 9/00248; G06K 9/00362; G06K 9/00261; G06K 9/00268; G06K 9/00671; G06K 9/3241; G06K 9/00228; G06K 9/00369; G06K 2009/3291; H04N 13/0468; H04N 13/0472; H04N 13/0475; H04N 13/0477; G06T 7/2033; G06T 2207/10016; G06T 2207/30201
 See application file for complete search history.

(56) References Cited

U.S. PATENT DOCUMENTS

| 5,563,988 | A | 10/1996 | Maes et al. |
| 5,616,078 | A | 4/1997 | Oh |
| 5,850,211 | A | 12/1998 | Tognazzini |
| 6,272,231 | B1 | 8/2001 | Maurer et al. |

(Continued)

FOREIGN PATENT DOCUMENTS

| CN | 1694045 A | 11/2005 |
| EP | 2732436 | 5/2014 |

(Continued)

OTHER PUBLICATIONS

Nokia N95 8GB Data Sheet, Nokia, 2007, 1 page.

(Continued)

*Primary Examiner* — Lun-Yi Lao
*Assistant Examiner* — Elliott Deaderick
(74) *Attorney, Agent, or Firm* — Novak Druce Connolly Bove + Quigg LLP

(57) ABSTRACT

Systems and approaches are provided for tracking an object using multiple tracking processes. By combining multiple lightweight tracking processes, object tracking can be robust, use a limited amount of power, and enable a computing device to respond to input corresponding to the motion of the object in real time. The multiple tracking processes can be run in parallel to determine the position of the object by selecting the results of the best performing tracker under certain heuristics or combining the results of multiple tracking processes in various ways. Further, other sensor data of a computing device can be used to improve the results provided by one or more of the tracking processes.

18 Claims, 6 Drawing Sheets

(56) References Cited

U.S. PATENT DOCUMENTS

| | | |
|---|---|---|
| 6,301,370 B1 | 10/2001 | Steffens et al. |
| 6,385,331 B2 | 5/2002 | Harakawa et al. |
| 6,392,667 B1 | 5/2002 | McKinnon et al. |
| 6,434,255 B1 | 8/2002 | Harakawa |
| 6,750,848 B1 | 6/2004 | Pryor |
| 6,863,609 B2 | 3/2005 | Okuda et al. |
| 6,956,566 B2 | 10/2005 | Gelb |
| 6,959,102 B2 | 10/2005 | Peck |
| 7,033,025 B2 | 4/2006 | Winterbotham |
| 7,092,554 B2 | 8/2006 | Chen et al. |
| 7,104,891 B2 | 9/2006 | Osako et al. |
| 7,199,767 B2 | 4/2007 | Spero |
| 7,301,526 B2 | 11/2007 | Marvit et al. |
| 7,379,566 B2 | 5/2008 | Hildreth |
| 7,401,783 B2 | 7/2008 | Pryor |
| 7,515,173 B2 * | 4/2009 | Zhang et al. ............... 348/14.16 |
| 7,519,223 B2 | 4/2009 | Dehlin et al. |
| 7,692,700 B2 | 4/2010 | Johannesson et al. |
| 7,806,604 B2 | 10/2010 | Bazakos et al. |
| 8,064,647 B2 | 11/2011 | Bazakos et al. |
| 8,098,885 B2 | 1/2012 | Zhang et al. |
| 8,238,026 B1 | 8/2012 | Kemme et al. |
| 8,350,896 B2 | 1/2013 | Kawakami et al. |
| 8,385,610 B2 | 2/2013 | Corcoran et al. |
| 8,385,687 B1 | 2/2013 | Blais-Morin |
| 8,644,565 B2 | 2/2014 | Du et al. |
| 8,712,470 B2 | 4/2014 | Cho |
| 8,878,773 B1 * | 11/2014 | Bozarth ............ G06K 9/00604 345/156 |
| 9,007,490 B1 | 4/2015 | Yuan et al. |
| 9,041,734 B2 | 5/2015 | Look et al. |
| 9,094,576 B1 | 7/2015 | Karakotsios |
| 2002/0071277 A1 | 6/2002 | Starner et al. |
| 2002/0167669 A1 | 11/2002 | Schwarz |
| 2002/0180799 A1 | 12/2002 | Peck et al. |
| 2003/0142068 A1 | 7/2003 | DeLuca et al. |
| 2004/0032409 A1 | 2/2004 | Girard |
| 2004/0140956 A1 | 7/2004 | Kushler et al. |
| 2004/0174496 A1 | 9/2004 | Ji et al. |
| 2004/0190759 A1 | 9/2004 | Caldwell |
| 2004/0230904 A1 | 11/2004 | Tada |
| 2005/0108162 A1 | 5/2005 | Sugihara |
| 2005/0133693 A1 | 6/2005 | Fouquet et al. |
| 2005/0175218 A1 | 8/2005 | Vertegaal et al. |
| 2005/0207614 A1 | 9/2005 | Schonberg et al. |
| 2005/0248529 A1 | 11/2005 | Endoh |
| 2006/0020898 A1 | 1/2006 | Kim et al. |
| 2006/0038881 A1 | 2/2006 | Starkweather et al. |
| 2006/0077347 A1 | 4/2006 | Liang et al. |
| 2006/0109422 A1 | 5/2006 | Clark et al. |
| 2006/0147094 A1 | 7/2006 | Yoo |
| 2006/0210045 A1 | 9/2006 | Valliath et al. |
| 2006/0256133 A1 | 11/2006 | Rosenberg |
| 2006/0257026 A1 | 11/2006 | Shiffer et al. |
| 2006/0269105 A1 | 11/2006 | Langlinais |
| 2007/0025598 A1 | 2/2007 | Kobayashi |
| 2007/0064112 A1 | 3/2007 | Chatting et al. |
| 2007/0164989 A1 | 7/2007 | Rochford et al. |
| 2007/0189582 A1 | 8/2007 | Hamza et al. |
| 2007/0236485 A1 | 10/2007 | Trepte |
| 2008/0005418 A1 | 1/2008 | Julian |
| 2008/0013826 A1 | 1/2008 | Hillis et al. |
| 2008/0019589 A1 | 1/2008 | Yoon |
| 2008/0040692 A1 | 2/2008 | Sunday et al. |
| 2008/0069438 A1 | 3/2008 | Winn et al. |
| 2008/0094490 A1 | 4/2008 | Compton et al. |
| 2008/0122803 A1 | 5/2008 | Izadi et al. |
| 2008/0123734 A1 | 5/2008 | Lin et al. |
| 2008/0136916 A1 | 6/2008 | Wolff |
| 2008/0140481 A1 | 6/2008 | Gold |
| 2008/0158096 A1 | 7/2008 | Breed |
| 2008/0170759 A1 | 7/2008 | Monro |
| 2008/0174570 A1 | 7/2008 | Jobs et al. |
| 2008/0211813 A1 | 9/2008 | Jamwal et al. |
| 2008/0253622 A1 | 10/2008 | Tosa et al. |
| 2008/0266289 A1 | 10/2008 | Park |
| 2008/0266530 A1 | 10/2008 | Takahashi et al. |
| 2008/0276196 A1 | 11/2008 | Tang |
| 2008/0291488 A1 | 11/2008 | Lin et al. |
| 2008/0298571 A1 | 12/2008 | Kurtz et al. |
| 2009/0031240 A1 | 1/2009 | Hildreth |
| 2009/0058845 A1 | 3/2009 | Fukuda et al. |
| 2009/0079813 A1 | 3/2009 | Hildreth |
| 2009/0115966 A1 | 5/2009 | Waldorf et al. |
| 2009/0128499 A1 | 5/2009 | Izadi et al. |
| 2009/0184981 A1 | 7/2009 | De Matos |
| 2009/0196460 A1 | 8/2009 | Jakobs et al. |
| 2009/0213120 A1 | 8/2009 | Nisper et al. |
| 2009/0265627 A1 | 10/2009 | Kim et al. |
| 2009/0296989 A1 | 12/2009 | Ramesh et al. |
| 2009/0313584 A1 | 12/2009 | Kerr |
| 2010/0002912 A1 | 1/2010 | Solinsky |
| 2010/0014718 A1 | 1/2010 | Savvides et al. |
| 2010/0014720 A1 | 1/2010 | Hoyos et al. |
| 2010/0066676 A1 | 3/2010 | Kramer et al. |
| 2010/0079426 A1 | 4/2010 | Pance et al. |
| 2010/0097332 A1 | 4/2010 | Arthur et al. |
| 2010/0103172 A1 | 4/2010 | Purdy |
| 2010/0103244 A1 | 4/2010 | Brandsma et al. |
| 2010/0124941 A1 | 5/2010 | Cho |
| 2010/0125816 A1 | 5/2010 | Bezos |
| 2010/0188328 A1 * | 7/2010 | Dodge et al. ............... 345/156 |
| 2010/0225743 A1 | 9/2010 | Florencio et al. |
| 2010/0283998 A1 | 11/2010 | Souchkov et al. |
| 2010/0328481 A1 | 12/2010 | Shimizu |
| 2011/0006978 A1 | 1/2011 | Yuan |
| 2011/0026014 A1 | 2/2011 | Mack et al. |
| 2011/0026609 A1 | 2/2011 | Sitrick |
| 2011/0063975 A1 | 3/2011 | Kuo et al. |
| 2011/0128223 A1 | 6/2011 | Lashina et al. |
| 2011/0128365 A1 | 6/2011 | Ren et al. |
| 2011/0141436 A1 | 6/2011 | Ono |
| 2011/0145718 A1 | 6/2011 | Ketola et al. |
| 2011/0221667 A1 | 9/2011 | Lee |
| 2011/0243388 A1 | 10/2011 | Sakaguchi et al. |
| 2011/0292078 A1 | 12/2011 | Lapstun et al. |
| 2011/0304541 A1 * | 12/2011 | Dalal ............................ 345/158 |
| 2011/0316853 A1 | 12/2011 | Bar-Zeev et al. |
| 2012/0075492 A1 | 3/2012 | Nanu et al. |
| 2012/0114172 A1 | 5/2012 | Du et al. |
| 2012/0206333 A1 | 8/2012 | Kim |
| 2012/0327196 A1 | 12/2012 | Ohba et al. |
| 2013/0038609 A1 | 2/2013 | Tsai et al. |
| 2013/0293530 A1 | 11/2013 | Perez et al. |
| 2014/0118346 A1 | 5/2014 | Tsai et al. |
| 2014/0125825 A1 | 5/2014 | Baer et al. |
| 2014/0232745 A1 | 8/2014 | Cho |

FOREIGN PATENT DOCUMENTS

| | | |
|---|---|---|
| JP | 2002-164990 | 6/2002 |
| JP | 2002-351603 | 12/2002 |
| JP | 2004-271671 | 9/2004 |
| JP | 2004-318826 | 11/2004 |
| JP | 2007-121489 | 5/2007 |
| JP | 2008-97220 | 4/2008 |
| JP | 2008-516352 | 5/2008 |
| JP | 2008-129775 | 6/2008 |
| JP | 2010-122879 | 6/2010 |
| WO | 02/15560 A3 | 2/2002 |
| WO | 2006/036069 A1 | 4/2006 |
| WO | WO 2009/127701 | 10/2009 |
| WO | WO 2013/010011 | 1/2013 |
| WO | WO 2015/026902 | 2/2015 |

OTHER PUBLICATIONS

"Face Detection: Technology Puts Portraits in Focus", Consumerreports.org, http://www.comsumerreports.org/cro/electronics-computers/camera-photograph/cameras, 2007, 1 page.

"Faceshift Documentation: Faceshift Studio Beta", http://www.faceshift.com/help/studio/beta/, 2012, 12 pages.

"Final Office Action dated Oct. 23, 2013", U.S. Appl. No. 12/786,297, 15 pages.

(56) References Cited

OTHER PUBLICATIONS

"Final Office Action dated Oct. 27, 2011", U.S. Appl. No. 12/332,049, 66 pages.
"Final Office Action dated Jun. 3, 2013", U.S. Appl. No. 13/083,303, 17 pages.
"Final Office Action dated Jun. 6, 2013", U.S. Appl. No. 12/332,049, 70 pages.
"Final Office Action dated Jul. 19, 2013", U.S. Appl. No. 13/209,243, 29 pages.
"First Office Action dated Mar. 22, 2013", China Application 200980146841.0, 39 pages.
"International Preliminary Examination Report on Patentability dated Oct. 17, 2013", International Application PCT/US2012/032148, 5 pages.
"International Search Report dated Oct. 2, 2012", International Application PCT/US2012/046518, Oct. 2, 2012, 7 pages.
"International Search Report dated Apr. 7, 2010", International Application PCT/US2009/065364, 2 pages.
"International Search Report dated Jul. 26, 2012", International Application PCT/US2012/032148, 7 pages.
"International Written Opinion dated Apr. 7, 2010", International Application PCT/US2009/065364, 7 pages.
"Introducing the Wii MotionPlus, Nintendo's Upcoming Accessory for the Revolutionary Wii Remote at Nintendo:: What's New", Nintendo Games, http://www.nintendo.com/whatsnew/detail/eM-MuRj_N6vntHPDycCJAKWhE09zBvyPH, Jul. 14, 2008, 2 pages.
"Non Final Office Action dated Jan. 16, 2013", U.S. Appl. No. 13/209,243, 27 pages.
"Non Final Office Action dated Nov. 7, 2012", U.S. Appl. No. 12/332,049, 64 pages.
"Non Final Office Action dated Nov. 7, 2013", U.S. Appl. No. 13/246,561, 18 pages.
"Non Final Office Action dated Dec. 21, 2012", Korea Application 10-2011-7013875, 4 pages.
"Non Final Office Action dated Dec. 6, 2012", U.S. Appl. No. 13/083,303, 16 pages.
"Non Final Office Action dated Mar. 28, 2013", U.S. Appl. No. 12/786,297, 15 pages.
"Non Final Office Action dated Apr. 2, 2013", Japan Application 2011-537661, 2 pages.
"Non Final Office Action dated Jun. 10, 2011", U.S. Appl. No. 12/332,049, 48 pages.
"Notice of Allowance dated Oct. 2, 2013", U.S. Appl. No. 13/076,322, 11 pages.
"Notice of Allowance dated Aug. 14, 2013", U.S. Appl. No. 13/083,303, 6 pages.
"Office Action dated May 13, 2013", Canada Application 2,743,914, 2 pages.
Brashear, Helene et al., "Using Multiple Sensors for Mobile Sign Language Recognition", International Symposium on Wearable Computers, 2003, 8 pages.
Cappelletta, Luca et al., "Phoneme-To-Viseme Mapping for Visual Speech Recognition", Department of Electronic and Electrical Engineering, Trinity College Dublin, Ireland, 2012, 8 pages.
Cornell, Jay , "Does This Headline Know You're Reading It?", h+ Magazine, located at <http://hplusmagazine.com/articles/ai/does-headline-know-you%E2%080%99re-reading-it>, last accessed on Jun. 7, 2010, Mar. 19, 2010, 4 pages.
Haro, Antonio et al., "Mobile Camera-Based Adaptive Viewing", MUM '05 Proceedings of the 4th International Conference on Mobile and Ubiquitous Mulitmedia., 2005, 6 pages.
Hartley, Richard et al., "Multiple View Geometry in Computer Vision", vol. 2, Cambridge, 2000.
Hjelmas, Erik , "Face Detection: A Survey", Computer Vision and Image Understanding 83, No. 3, 2001, pp. 236-274.
Horn, Berthold K. et al., "Determining Optical Flow", Artificial Intelligence 17, No. 1, 1981, pp. 185-203.
Kamenicky, Jan et al., "Superfast Superresolution", "Superfast Superresolution," 18th IEEE International Conference on Image Processing, 2011, Šroubek Filip, Kamenický Jan, Peyman Milanfar, 2011, 4 pages.
Lucas, Bruce D. et al., "An Iterative Image Registration Technique with an Application to Stereo Vision", Proceedings of the 7th International Conference on Artificial Intelligence (IJCAI) 1981, Aug. 24-28, Vancouver, British Columbia, 1981, pp. 674-679.
Padilla, Raymond , "Eye Toy (PS2)", <http://www.archive.gamespy.com/hardware/august03/eyetoyps2/index.shtml, Aug. 16, 2003, 2 pages.
Park, Sung C. et al., "Super-Resolution Image Reconstruction: A Technical Overview", "Super-Resolution Image Reconstruction: A Technical Overview," IEEE Signal Processing Magazine, May 2003, Park, Sung Cheol; Park, Min Kyu, 2003, 16 pages.
Schneider, Jason , "Does Face Detection Technology Really Work? Can the hottest new digital camera feature of 2007 actually improve your people pictures? Here's the surprising answer!", http://www.adorama.com/catalog.tpl?article=052107op=academy_new, May 21, 2007, 5 pages.
Tsai, Roger Y. , "A Versatile Camera Calibration Technique for High-Accuracy 3D Machine Vision Metrology Using Off-the-Shelf TV Cameras and Lenses", "A Versatile Camera Calibration Technique for High-Accuracy 3D Machine Vision Metrology Using Off-the-Shelf TV Cameras and Lenses," IEEE Journal of Robotics and Automation, vol. RA-3, No. 4, Aug. 1987, Tsai, Roger Y., 1987, 22 pages.
Tyser, Peter , "Control an iPod with Gestures", http://www.videsignline.com/howto/170702555, Sep. 11, 2005, 4 pages.
Van Den Berg, Thomas T. , "Near Infrared Light Absorption in the Human Eye Media", Vision Res., vol. 37, No. 2, 1997, pp. 249-253.
Yang, Ming-Hsuan et al., "Detecting Faces in Images: A Survey", IEEE Transactions on Pattern Analysis and Machine Intelligence, vol. 24, No. 1, 2002, pp. 34-58.
Yang, Qingxiong et al., "Real-time Specular Highlight Removal Using Bilateral Filtering", http://vision.ai.uiuc.edu/~qyang6/, 2010, 14 pages.
Zhengyou, Zhang , "A Flexible New Technique for Camera Calibration", "A Flexible New Technique for Camera Calibration," IEEE Transactions on Pattern Analysis and Machine Intelligence, Zhengyou Zhang, 22(11): 1330-1334, 2000, 2000, 22 pages.
Zyga, Lisa , "Hacking the Wii Remote for Physics Class", PHYSorg.com, http://www.physorg.com/news104502773.html, Jul. 24, 2007, 2 pages.
PCT International Search Report and Written Opinion of the International Searching Authority mailed Oct. 2, 2012, for International Application No. PCT/US12/46518 filed Jul. 12, 2012, 7 pages.
USPTO Notice of Allowance dated Jul. 8, 2014, for U.S. Appl. No. 12/786,297, filed May 24, 2010, 5 pages.
USPTO Corrective Notice of Allowance dated Jul. 31, 2014, for U.S. Appl. No. 12/786,297, filed May 24, 2010, 3 pages.
USPTO Non-Final Office Action dated Apr. 7, 2014, for U.S. Appl. No. 13/332,128, filed Dec. 20, 2011, 28 pages.
USPTO Notice of Allowance dated Dec. 4, 2014, for U.S. Appl. No. 13/332,128, filed Dec. 20, 2011, 2 pages.
USPTO Non-Final Office Action dated Jan. 21, 2014, for U.S. Appl. No. 13/107,749, filed May 13, 2011, 26 pages.
USPTO Final Office Action dated Jun. 17, 2014, for U.S. Appl. No. 13/107,749, filed May 13, 2011, 29 pages.
PCT International Search Report and Written Opinion, mailed Dec. 18, 2014, for International Patent Application PCT/US2014/051817, listed as item 21 above, 7 pages.

\* cited by examiner

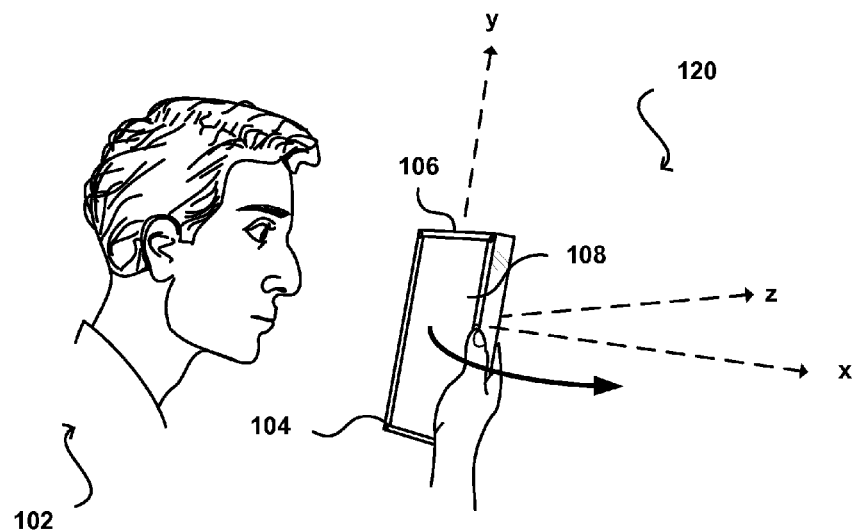
FIG. 1D
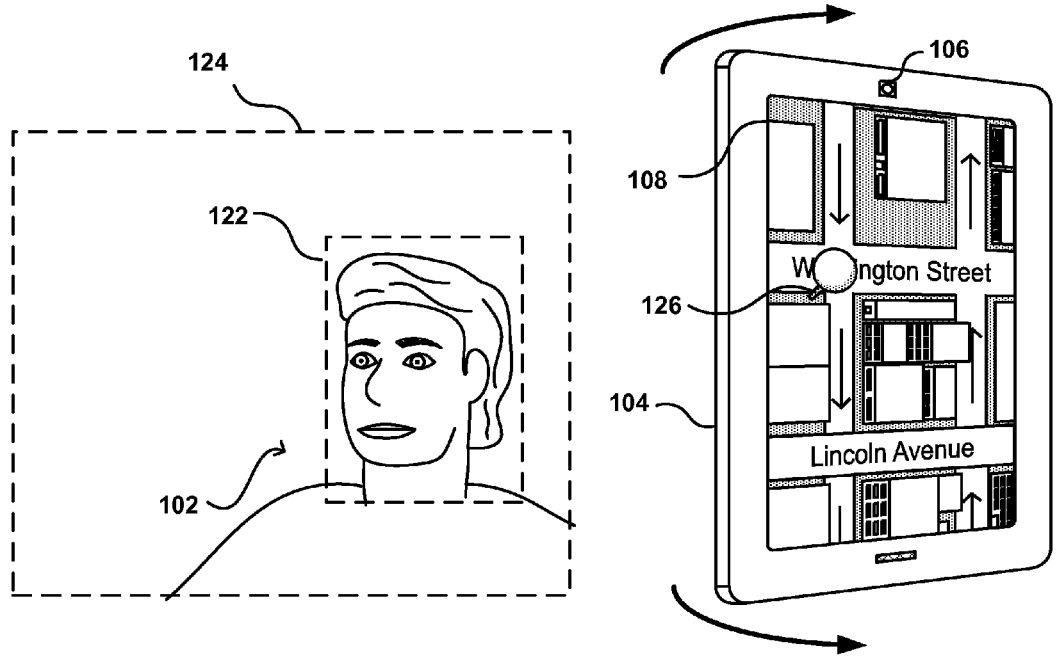
FIG. 1E
FIG. 1F

MULTI-TRACKER OBJECT TRACKING

BACKGROUND

Object tracking has several important applications for users of computing devices, such as personal computers, tablets, smartphones, or head-mounted displays and other wearable computing devices (e.g., eyeglasses, visors, gloves, watches, wristbands, etc.). For example, object tracking can be implemented for recognizing certain user gestures, such as head nods or shakes, eye winks or other ocular motion, or hand and/or finger gestures, as input for the device. Object tracking can also be utilized for advanced device security features such as ensuring "live" facial recognition, fingerprinting, retinal scanning, or identification based on gait. Devices capable of object tracking can also be configured for video editing techniques such as video stabilization (e.g., to remove jitter) or to render smooth camera motions due to panning, tilting, or dollying in/dollying out. Object tracking, however, can be challenging because of abrupt motion of the tracked object(s), changes in appearance of the tracked object(s) and background, non-rigidity of the tracked object(s), and device motion. In addition, factors such as image sensor and lens characteristics, illumination conditions, noise, and occlusion can also affect how an object is represented from image to image or frame to frame. Further, the requirements of real-time processing can often be at odds with the objective of minimizing processing and power use on portable computing devices.

BRIEF DESCRIPTION OF THE DRAWINGS

Various embodiments in accordance with the present disclosure will be described with reference to the drawings, in which:

FIGS. 1A-1F illustrate an example approach for tracking an object of interest in accordance with an embodiment;

DETAILED DESCRIPTION

Figure 1A:
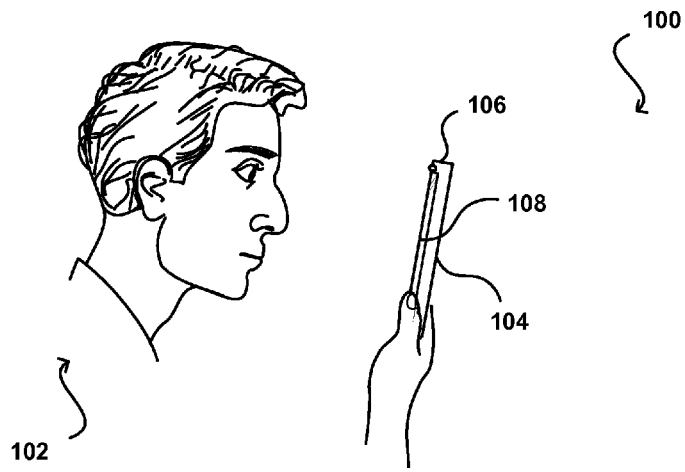

Conventional approaches for object tracking may use a full object detection process to track an object across a series of images or video frames. To be robust, such object detection processes can be processor-intensive. When such processes are run for every image or video frame, the power of a portable computing device operating on battery power can be quickly drained. In addition to high power consumption, the conventional object tracking process and/or other applications running on the computing device may suffer from latency due to the memory, processing, and other computing resources used by such an approach. Some conventional approaches may attempt to conserve power and other computing resources by "sampling" images at longer intervals for tracking the object. However, such approaches can introduce substantial delay and diminish a user's experience by appearing to be unresponsive for real-time applications.

Systems and methods in accordance with various embodiments of the present disclosure may overcome one or more of the aforementioned and other deficiencies experienced in conventional approaches for object tracking. By combining a plurality of lightweight tracking processes, object tracking can be made more robust, use less power than conventional object tracking approaches, and enable a computing device to respond to input corresponding to the motion of the object in real time. In some embodiments, the multiple tracking processes can run concurrently to determine where the object of interest is located in the images by selecting the results of the best performing tracker under certain heuristics or by combining the results of a plurality of the tracking processes in various ways. For example, the output of each of the trackers can be combined using rule-based methods, classification-based methods, or estimation-based methods.

In various embodiments, other sensor data of a computing device can be used to improve one or more of the tracking processes. In some embodiments, motion and/or orientation data captured by certain sensors, such as an accelerometer, gyroscope, inclinometer, and/or magnetometer, can be used as a cue for where to begin tracking the object of interest in images or to circumscribe regions of images for tracking the object of interest. For instance, if the motion or orientation determination sensors indicate a right-ward rotation of the device, a tracking process can begin searching for the object towards a right region of the images and/or the tracking process can be limited to searching for the object in the right region of the images (for a front-facing camera). In other embodiments, an ambient light sensor can be used to determine an amount of light of the current environment in which the computing device and user are situated and certain tracking processes may be excluded from the comprehensive object tracking process or the weighting of certain tracking processes can be affected based on the determined amount of light. For example, some tracking processes may perform poorly under low illumination conditions and such processes may not be run for the comprehensive object tracking process or may be weighted less than tracking processes that are invariant to changes in illumination. In still other embodiments, data from a proximity sensor, depth sensor, distance sensor, structured lighting transceiver, and the like can be used to provide depth or distance information.

Various other functions and advantages are described and suggested below in accordance with the various embodiments.

FIGS. 1A-1F illustrate an example approach for tracking an object of interest in accordance with an embodiment. In the example situation 100 of FIG. 1A, a user 102 can be seen viewing a display screen 108 of a computing device 104. Although a portable computing device (e.g., a smart phone, tablet, or portable media player) is shown that can be held in the user's hands, it should be understood that other types of computing devices can utilize aspects of the various embodiments as should be apparent in light of the teachings and suggestions contained herein. The computing device can include at least one camera 106 located on the front of the device and the on same surface as the display screen to capture image data of subject matter facing the front of the device, such as the user 102 viewing the display screen. It should be understood that, while the components of the example device are shown to be on a "front" of the device, there can be similar or alternative components on the "top," "side," or "back" of the device as well (or instead). Further, directions such as "top," "side," and "back" are used for purposes of explanation and are not intended to require specific orientations unless otherwise stated. In some embodiments, a computing device may also include more than one camera on the front of the device and/or one or more cameras on the back (and/or sides) of the device capable of capturing image data facing the back surface (and/or top, bottom, or side surface) of the computing device. In this example, the camera 106 comprises a digital camera incorporating a CMOS image sensor. In other embodiments, a camera of a device can incorporate other types of image sensors (such as a charged couple device (CCD)) and/or can incorporate multiple cameras, including at least one wide-angle optical element, such as a fish eye lens, that enables the camera to capture images over a wide range of angles, such as 180 degrees or more. Further, each camera can comprise a digital still camera, configured to capture subsequent frames in rapid succession, or a video camera able to capture streaming video. In still other embodiments, a computing device can include other types of imaging elements, such as ambient light sensors, IR sensors, and other optical, light, imaging, or photon sensors.

Figure 1B:
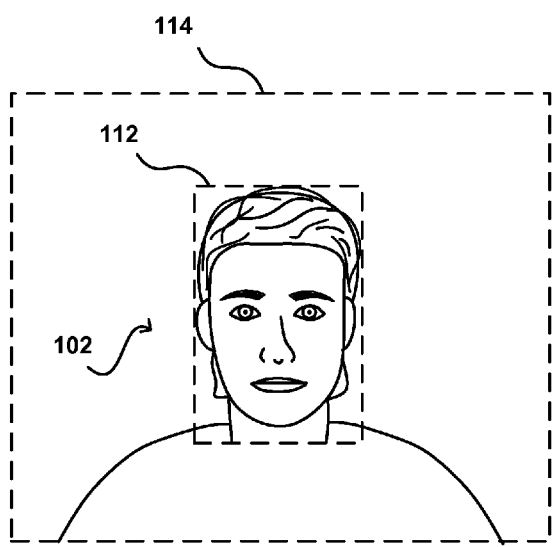
Figure 1C:
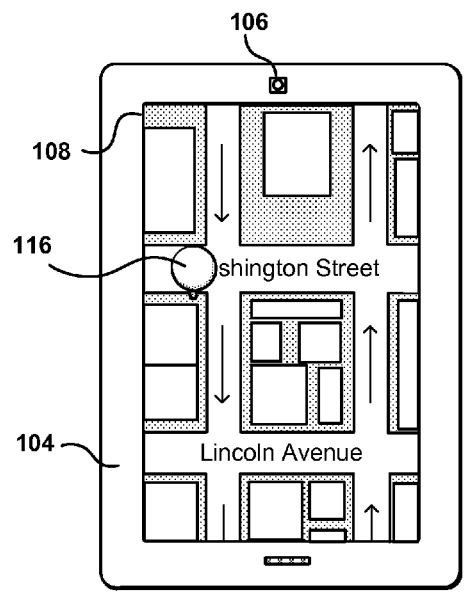

As illustrated in FIG. 1B, when the user positions the computing device directly in front of himself and gazes towards the display screen, the image data captured by the camera of the device can encompass the image 114. In FIG. 1C, content that depends on the position of the user with respect to the device 104 is displayed on display screen 108 of the device. In particular, the user has started up a mapping application installed on the computing device which causes the device to render a first view or perspective of a three-dimensional (3-D) street map on the display screen and an icon 116 indicating the location of the user (and device) in relation to the street map. The mapping application relies on the pose of the head or face of the user with respect to the device to render an appropriate perspective of the 3-D street map, and leverages software (e.g., user application, software library, operating system) for object detection to provide such information. Returning back to FIG. 1B, the object detection process is adapted for locating the head or face of a person. Here, the object detection process locates the head or face of the user 102 within the image 114 and provides as output the dimensions of a bounded box 112 indicating where the head or the face of the user is located in the image. In various embodiments, software executing on a computing device attempts to determine the position, orientation, and/or movement of objects, such as the head or face of a user, in three-dimensional space. Such a determination can be performed using various types of configurations. For example, two-dimensional image information can be captured to determine certain direction and motion information using a conventional camera and the computing device can utilize structured lighting to obtain three-dimensional information by projecting a regular pattern of light (e.g., infrared (IR) light) and analyzing the changes in the reflected pattern due to three dimensional objects. In other embodiments, other approaches such as those used for motion capture can be implemented for monitoring the change in location of specific features during user movement. For example, in some embodiments, two-dimensional image capture can be enhanced using a distance sensor, range finders, ultrasonic transceiver, or other such device capable of providing distance information. In some embodiments, three-dimensional or stereoscopic image information can be captured using multiple cameras to provide three-dimensional point data, or disparity information that can be used to determine motion in three dimensions. Various other approaches can be utilized as well as should be apparent to one of ordinary skill in the art in light of the teachings and suggestions contained herein.

In FIG. 1D, an example situation 120 illustrates that the user 102 has tilted the computing device 104 to the right with respect to the perspective of the user, i.e., the user has rotated the device along the longitudinal or y-axis (where the lateral axis corresponds to the x-axis and the depth of the device or vertical axis corresponds to the z-axis) to obtain a second view or perspective of the 3-D street map. As seen in FIG. 1E, the tilt or rotation of the device causes the camera to capture a different view or perspective of the user within image 124, here, a three quarter profile of the head or face of the user. The position of the user's face has also shifted from the center of the image to a right region of the image because of the tilt or rotation of the device. In this example, the apparent motion of the face or head of the user (which is actually due to the motion of the device) is tracked from the initial position detected in FIG. 1B to the new position depicted in FIG. 1E. In FIG. 1F, the 3-D street map is rendered based on the apparent movement of the user's head or face. For instance, the 3-D street map of FIG. 1C comprised a top-down view of each of the buildings with no details of the faces of the buildings when the user gazes upon the display screen straight on. As the user rotates the device rightward and the apparent motion of the head or face of the user is tracked moving rightward, the contents of the 3-D street map begin to include details of the western faces of each of the buildings in the map. When the user tilts the device forward, i.e., rotating the device along the x-axis such that the top portion of front of the device is further away from the user and the bottom portion of the front of the device is closer to the user, details of the southern faces of the buildings may be displayed. Likewise, tiling the device backwards may cause details of the northern faces to be rendered for display and rotating the device leftward may reveal additional details of the eastern faces of the buildings. It will be appreciated that objects of interest, such as the face or head of the user, can generally be tracked according to six degrees of freedom (e.g., motion along the x-, y-, and z-axes or forward/backward, up/down, and left/right, and rotation along the x-, y-, and z-axes or pitch, yaw, and roll) and the device can be configured to appropriately respond to such motions. For example, when the user tilts the device such that the top left corner of the device is closest to the user, the mapping application of FIGS. 1A-1F may cause details of the northern and western faces of the buildings in the map to be displayed and when the user positions the device such that the bottom right corner of the device is closest to the user, details of the southern and eastern faces of the buildings can be rendered for display.

Figure 2A:
FIGS. 2A-2C illustrate example stereoscopic image data that can be captured in accordance with various embodiments.
Figure 2B:
Figure 2C:

As mentioned, various embodiments include tracking of one or more objects of interest in three-dimensional space. For example, FIGS. 2A and 2B illustrate images 200 and 220 that could be captured using a pair of cameras (e.g., stereoscopic cameras) embedded in a computing device. In various embodiments, the pair of cameras may capture the images simultaneously or substantially simultaneously and therefore would include at least some matching points of interest in their respective images. For example, the user's finger, nose, eyes, eyebrows, lips, or other features may be detected or tracked by the computing device in both images by using the various techniques discussed elsewhere herein. FIG. 2C illustrates an example combination image 240 showing the relative position of various objects in the captured images 200 and 220 if those images were "overlaid" or "superimposed" the greatest amount of disparity, or lateral offset, between images. Objects farther away from the device, such as a painting on the wall, have relatively small amounts of disparity. Objects between these two areas will have intermediate amounts of disparity based upon the relative distance of those objects from the cameras.

Figure 3:
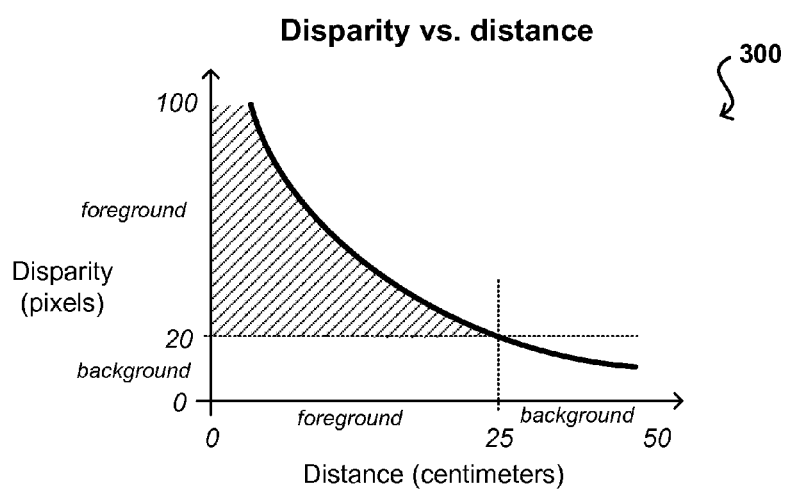
FIG. 3 illustrates an example plot showing a relationship of disparity with distance for an example stereoscopic imaging process that can be used in accordance with various embodiments.

FIG. 3 illustrates an example plot 300 showing a relationship of disparity with respect to distance. As illustrated, the amount of disparity is inversely proportional to the distance from the cameras, such that there can be significantly more disparity in the near camera field (e.g., 0 to 1.0 m) than in the far field (e.g., 1.0 m to infinity). Further, the decrease is not linear but decreases more quickly near the device than at a distance, as objects in the distance can have little to no disparity regardless of whether they are twenty feet away or a mile away. An approach in accordance with various embodiments can determine the distance between an object or feature and the device based on the amount of stereo disparity for the object between two images captured by the pair of cameras. For example, a user's face looking at a smart phone might typically be located within 50 centimeters from the device. By examining the disparity relationship curve 300 or relationship, the computing device (or an application or user of the device) can determine that the amount of disparity at fifty centimeters for the configuration parameters of the current device (e.g., camera resolution, camera separation, field of view, etc.) is twenty five pixels of separation between images. Using this information, the device can analyze matching feature points (e.g., nose, eyes, fingertips, etc.) in the stereo images, and determine the approximate distance between those feature points and the computing device. For example, the amount of disparity, D, at a given distance, d, can be represented by the relationship:

$$D = \frac{fxB}{d}$$

where f is the focal length of each of the matched cameras and B is the baseline, or distance between the viewpoints of the cameras based at least in part upon their relative positions and separation. In this example, if the focal length of a camera is four hundred pixels and the baseline is five centimeters, for a distance of one meter the disparity would be twenty pixels. Based on relationships such as this one, the computing device may be able to determine the distance between the object of interest and the device.

In some embodiments, an object detection process is used to detect an object of interest and determine where a representation of the object of interest is located in one or more images. Approaches for detecting an object can be based on feature detection, background subtraction, segmentation, supervised learning, among others. Feature-based detection approaches generally involve extracting features from an image and applying various rules, metrics, or heuristics to determine whether the specified object is present in the image. Extracted features can be low-level image features, such as points (e.g., line intersections, high variance points, local curvature discontinuities of Gabor wavelets, inflection points of curves, local extrema of wavelet transforms, Harris corners, Shi Tomasi points), edges (e.g., Canny edges, Shen-Castan (ISEF) edges), or regions of interest (e.g., blobs, Laplacian of Gaussian blobs, Difference of Gaussian blobs, Hessian blobs, maximally stable extremum regions (MSERs)). An example of a low-level image feature-based approach for user detection is the facial detection method of Sirohey. In the Sirohey method, an edge map (generated via, e.g., a Canny detector, Sobel filter, Marr-Hildreth edge operator) and heuristics are used to remove and group edges from an input image so that only the edges of the contour of a face remain. A box or ellipse is then fit to the boundary between the head region and the background. Low-level feature-based methods can also be based on gray level information or skin color. For example, facial features such as eyebrows, pupils, and lips generally appear darker than surrounding regions of the face and this observation can be used to detect a face within an image. In one such approach, a low resolution Gaussian or Laplacian of an input image can be utilized to locate linear sequences of similarly oriented blobs and streaks, such as two dark blobs and three light blobs to represent eyes, cheekbones, and nose and streaks to represent the outline of the face, eyebrows, and lips. Geometric rules can be applied to analyze the spatial relationships among the blobs and streaks to verify whether a person is located in the image. Skin color can also be used as a basis for detecting and/or tracking a user because skin color comprises a limited range of the color spectrum that can be relatively efficient to locate in an image.

Extracted features can also be based on higher-level characteristics or features of an object, such as the eyes, nose, and/or mouth of a person or the windshield, doors, and tires of a vehicle. One example of higher-level feature detection approach may involve detection of a higher level features of an object of interest (e.g., head or face) and then validating existence of the object of interest in an image by detecting more granular components of that object (e.g., eyes, nose, mouth). In this example, a representation of a user can be detected within an image by generating from the image a set of pyramidal or hierarchical images that are convolved and subsampled at each ascending level of the image pyramid or hierarchy (e.g., Gaussian pyramid, Difference of Gaussian pyramid, Laplacian pyramid). At the highest level, comprising the lowest resolution image of the image pyramid or hierarchy, the most general set of rules can be applied to find whether a user is represented. An example set of rules for detecting a face may include the upper round part of a face comprising a set of pixels of uniform intensity, the center part of a face comprising a set of pixels of a second uniform intensity, and the difference between the intensities of the upper round part and the center part of the face being within a threshold intensity difference. The image pyramid or hierarchy is descended and face candidates detected at a higher level conforming to the rules for that level can be processed at finer resolutions at a lower level according to a more specific set of rules. An example set of rules at a lower level or higher resolution image of the pyramid or hierarchy can be based on local histogram equalization and edge detection, and rules for the lowest level or highest resolution image of the pyramid or hierarchy can be based on facial feature metrics. In another approach, face candidates are located based on the Kanade projection method for locating the boundary of a face. In the projection method, an intensity profile of an input image is first analyzed along the horizontal axis, and two local minima are determined to be candidates for the left and right side of a head. The intensity profile along the vertical axis is then evaluated and local minima are determined to be candidates for the locations of the mouth, nose, and eyes. Detection rules for eyebrow/eyes, nostrils/nose, and mouth or similar approaches can be used to validate whether the candidate is indeed a face.

Background subtraction involves developing a model of the background of the scene in a first image and then determining outlier pixels from the background model in a second image. Significant deviations from the background model indicate the presence of the object of interest. One background subtraction method may be based on modeling the color of each pixel, I(x, y) in an image, of a stationary background as a single three-dimensional (e.g., luma/chrominance system, such as YUV or YCbCr) Gaussian distribution:

$$I(x,y) \approx L(\mu(x,y), \Sigma(x,y)),$$

where $\mu(x,y)$ is the mean, $\Sigma(x,y)$ is the covariance, and L is the likelihood of a color coming from the background model. The brightness (or luminance) and color (or chrominance) is observed over several consecutive frames to determine the mean and covariance of the Gaussian distribution, and the likelihood is calculated. Pixels deviating from the background model are further identified as the object of interest. In another embodiment, the background of an image can be modeled as a mixture of Gaussians. A pixel in a current frame can be checked against the background model by comparing it with every Gaussian in the model until a matching Gaussian is found. If a match is found, the mean and variance of the matched Gaussian is updated, otherwise a new Gaussian with the mean equal to the current pixel color and some initial variance is introduced into the mixture of Gaussians. The means of the highest weighted Gaussians at each pixel represent the most temporally persistent pixel and can be identified as background pixels, and the means of the Gaussians with the second highest weight represent pixels that are observed less frequently, and can be identified as the object of interest. In another embodiment, background modeling can be based on region-based scene information. Kernel density estimation can be used to model each pixel of the background. During the subtraction process, pixels are matched to corresponding background pixels as well as nearby pixels to filter out camera jitter or small movements in the background. In yet another embodiment, texture and color features can be used to perform background subtraction over small blocks of the image. As texture does not substantially vary with respect to changes in illumination, such an approach may be less sensitive to illumination changes. Other background subtraction techniques include modeling background pixels as discrete states in the environment (e.g., background, foreground, shadow) and using hidden Markov models (HMM) to identify small blocks of an image that correspond to each state, modeling the background using eigenspace decomposition with the background corresponding to the most descriptive eigenvectors and the foreground corresponding to the difference between the projection of the current image (or video frame) to the eigenspace, or modeling the background using autoregressive moving average (ARMA) processes to filter repetitive motion (e.g., grass blowing in the wind or swaying trees).

Segmentation-based approaches partition an image into similar regions, and can include mean-shift clustering, graph cuts, active contours, among others. The mean-shift approach finds clusters in the spatial and color space [l, u, v, x, y] where l is the brightness, u and v are the chrominance, and x and y are the location. A large number of hypothesized cluster centers are randomly chosen, and each cluster center is moved to the mean lying inside a multidimensional ellipsoid centered on the cluster center, with some of clusters merging during this mean-shift process. The vector corresponding to the old and new cluster centers are called the mean-shift vectors, and the mean-shift vectors are calculated iteratively until the cluster centers do not change position. In graph cut methods, image segmentation is approached as a graph partitioning problem with pixels representing nodes of a graph that are partitioned into disjoint subgraphs by pruning the weighted edges of the graph. The total weight of the pruned edges between two subgraphs is called a cut, and the weights may be based on similarities in color, brightness, and/or texture. In one embodiment, a minimum cut criterion can be used to find partitions that minimize a cut. In another embodiment, a normalized cut can be used that depends on edge weights as well as the ratio of the total connection weights of nodes in each partition to all nodes of the graph.

In active contours approaches, a candidate object is segmented by transforming a closed contour of the candidate object's boundary such that the contour tightly encloses the candidate object according to an energy function, such as:

$$E(C) = \int_0^1 E_{int}(v) + E_{im}(v) + E_{ext}(v) \, ds,$$

where s is the arc-length of the contour C, $E_{int}$ specifies the regularization constraints, $E_{im}$ is the image-based energy, and $E_{ext}$ specifies additional constraint. $E_{int}$ typically includes a curvature term, first-order ($\nabla v$), or second-order ($\nabla^2 v$) continuity terms to find the shortest contour. The image-based energy, $E_{im}$, can be computed locally or globally. Local information is often determined from an image gradient evaluated around the contour while global features are computed inside and outside the object. Global features can include color and texture.

Supervised learning approaches involve learning different views or perspective of an object of interest from a set of examples within an object class. Supervised learning methods can include principal component analysis (PCA), neural networks, support vector machines (SVM), inductive learning, adaptive boosting (Adaboost), among others. Eigenfaces are an example of an approach based on PCA. PCA is performed on a training set of images known to include faces to determine the eigenvectors of the covariance matrix of the training set. The Eigenfaces span a subspace called the "face space." Images of faces are projected onto the subspace and clustered. To detect a face of a person in an image, the distance between a region of the image and the "face space" is computed for all locations in the image. The distance from the "face space" is used as a measure of whether image subject matter comprises a face and the distances from "face space" form a "face map." A face can be detected from the local minima of the "face map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the autoassociative neural network, the probabilistic decision-based neural network (PDBNN), and the sparse network of winnows (SNoW). Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of face patterns at multiple resolutions. At each scale, a face image is decomposed into subregions and the subregions are further decomposed according to space, frequency, and orientation. The statistics of each projected subregion are estimated from the projected samples to learn the joint distribution of object and position. A face is determined to be within an image if the likelihood ratio is greater than the ratio of prior probabilities, i.e., $$\frac{P(\text{image}|\text{object})}{P(\text{image}|\text{non-object})} > \frac{P(\text{non-object})}{P(\text{object})}.$$

Inductive learning approaches, such as those based on the C4.5 algorithm or the Find-S algorithm, can also be used to detect the presence of persons in images.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. Viola-Jones scans a sub-window of an input image using features consisting of Haar-like features, black and white boxlets that are weighted during training, and resized over several passes of the detector. A sub-window is determined to be a face candidate if the difference of the sum of pixels within two regions meets a threshold θ for a Haar-like feature determined during the training stage:

$$h_j(x) = \begin{cases} 1 & \text{if } p_j f_j(x) < p_j \theta_j \\ 0 & \text{otherwise} \end{cases},$$

where $h_j x(x)$ is a weak classifier consisting of feature $f_j$ and $p_j$ indicates the direction of the inequality sign. In Viola-Jones, x is defined as a 24×24 pixel sub-window of the input image.

These computations can be quickly and efficiently determined based on an "integral image" derived from the input image, and defined as:

$$ii(x,y) = \Sigma_{x' \leq x, y' \leq y} i(x',y'),$$

where ii(x,y) is the pixel value at location (x,y) of the integral image and i(x,y) is the pixel value at location (x,y) of the input image. That is, the pixel value at (x,y) of the integral image is determined by summing the pixel values above and to the left of x,y, inclusive, in the input image. The integral image can be used to determine the sum of any rectangle ABCD in the input image at constant time by reference to the integral image:

$$\Sigma_{(x,y) \in ABCD} i(x,y) = ii(D) + ii(A) - ii(B) - ii(C),$$

where A is the top-left corner of the rectangle, B the top-right corner, C the bottom-left corner, and D the bottom-right corner. Viola-Jones further utilizes the concept of attentional cascading which observes that within an image, most sub-windows are non-face instances. Thus, smaller and more efficient classifiers can be used to reject sub-windows unlikely to be faces at earlier stages of the detector while keeping almost all of the positive instances. More complex classifiers are used at later stages to examine face candidates that have not been rejected as face candidates.

Surveys of various approaches of object detection are discussed in Yang, Ming-Hsuan et al., "Detecting faces in images: A survey." *Pattern Analysis and Machine Intelligence, IEEE Transactions* on 24, no. 1 (2002): 34-58 and Hjelmå, Erik et al. "Face detection: A Survey." *Computer Vision and Image Understanding* 83, no. 3 (2001): 236-274, which are each incorporated herein by reference.

Systems and approaches in accordance with various embodiments track an object from an initial known position in a first set of one or more images captured at a first time (simultaneously or substantially at the same time) to a second position in a second set of one or more images captured at a second time (simultaneously or substantially at the same time) using a plurality of tracking processes. That is, an object detection process can first be used to determine the position of a representation of an object of interest in the first images and multiple object tracking processes can be used to track the object of interest in subsequent images. While conventional tracking processes may re-run an object detection process to track an object of interest, various embodiments can additionally or alternatively utilize a plurality of light-weight tracking processes to track the object over time. In at least some embodiments, one or more object detection processes can be included as a part of the comprehensive object tracking process. The one or more object detection processes may be different from the first object detection process used to determine the initial position of the object of interest in the first images, such as an object detection process that is less processor-intensive than the first object detection process. In addition, or alternatively, the one or more object detection processes can include a modified version of the first object detection process that uses fewer computations for purposes of tracking. For example, the Viola-Jones object detection process can be adapted to use fewer features or classifiers.

Figure 4A:
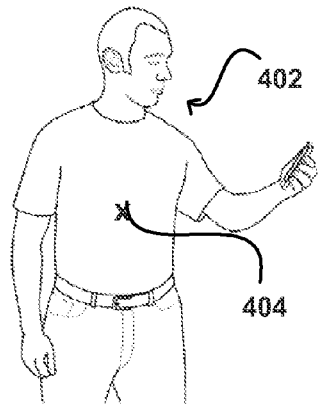
FIGS. 4A-4F illustrate example approaches of tracking an object of interest in images that can be used in accordance with various embodiments.
Figure 4B:
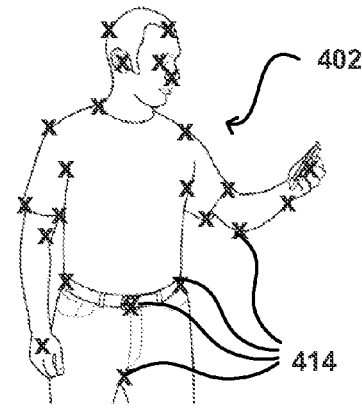

Various approaches can be used to track an object of interest within images over time. In at least some embodiments, one or more point tracking processes can be used as part of the comprehensive object tracking process. FIGS. 4A and 4B illustrate example approaches of point tracking that can be used to track an object of interest in accordance with various embodiments. In FIG. 4A, the object of interest, a user 402, is represented as a single point 404 such as a center of the detected object. In some embodiments, the object may be defined or represented as a vector from a point corresponding to the object to a point corresponding to a computing device. For example, if an object is a head or face of a user, the user's face or head can be represented as a three-dimensional vector from a point between the user's eyes to a point at the center of the front face of the computing device.

FIG. 4B illustrates an example representation of an object wherein salient features of the object of interest, user 402, are identified and assigned multiple points 414 in the image. Points can be determined using the Moravec detector, Harris corner detector, the Kanade Shi Tomasi (KLT) detector, the Scale-Invariant Feature Transform (SIFT) detector, or variations thereof. The Moravec detector analyzes variation of the image intensities in a 4×4 patch in the horizontal, vertical, and diagonal directions and selects the minimum of the four variations as representative for the patch. A Moravec point is one whose intensity variation is a local maximum in a 12×12 patch. The Harris corner detector calculates the first order image derivatives, $(I_x, I_y)$ in the x- and y-directions to determine variations in directional intensity. A second moment matrix, which defines such variation, is evaluated for each pixel in a small neighborhood:

$$M = \begin{pmatrix} \Sigma I_x^2 & \Sigma I_x I_y \\ \Sigma I_x I_y & \Sigma I_y^2 \end{pmatrix}$$

A Harris corner is a point determined using the determinant and the trace of M which measures the variation in a local neighborhood:

$$R = \det(M) - k \cdot tr(M)^2$$

The Harris corners are identified by thresholding R after applying nonmaxima suppression. The KLT detector uses the same second moment matrix as the Harris corner detector. However, the confidence R of the KLT corner detector is calculated using the minimum eigenvalue of M, $\lambda_{min}$. Candidate KLT corners are selected by thresholding R. The KLT detector eliminates the candidates that are spatially close to each other.

SIFT features are invariant to scaling and orientation and partially invariant to affine transformations and changes in illumination. The SIFT detector first establishes a scale space by convolving an image with Gaussian filters at different scales. The convolved images are used to generate Difference of Gaussian (DoG) images. Candidate SIFT feature points are selected from the minima and minima of the DoG images across scales. The location of each of the candidate SIFT feature points are updated by interpolating the color values using neighboring pixels. Low contrast candidates and candidates along borders are eliminated. The remaining candidates are assigned orientations based on the peaks in the histograms of gradient directions in a small neighborhood around a candidate. As with single point representations of an object, multiple point representations of an object can be defined according to vectors of points corresponding to the object to one or more points corresponding to the computing device. Other feature point detection techniques that can be used include Förstner corner detection, Wang and Brady corner detection, smallest univalue segment assimilating nucleus (SUSAN) corner detection, Trajkovic and Hedley corner detection, features from accelerated segment test (FAST) detection, among others.

Point tracking methods can be deterministic or probabilistic. Deterministic approaches attempt to minimize a cost of associating each object in a first image or frame to an object in a second image or frame based on a set of motion constraints. The correspondence cost is formulated as a combinatorial optimization problem that can be solved by determining one-to-one correspondences among all possible associations using optimal assignment methods, such as greedy search methods. The correspondence is typically constrained according to proximity, maximum velocity, small velocity change, common motion, rigidity, and/or proximal uniformity. Proximity assumes the position of the object will not change significantly from one image or frame to another. Maximum velocity assumes an upper bound on object velocity and constrains the possible correspondences to a circular neighborhood around the object. Small velocity change assumes that the direction and speed of the object does not substantially change over time. Common motion assumes that the velocity of an object within a small neighborhood is similar. Rigidity assumes that the objects will not deform over time and therefore the distance between any two points of the object does not change. Proximal uniformity combines the proximity and small velocity change assumptions.

Probabilistic point tracking methods model the uncertainties of sensor data to establish correspondence from image to image or frame to frame. For example, measurements obtained from sensors often include noise and an object or a device attempting to track an object may be susceptible to random motions that aren't necessarily desirable to capture, such as a device user's shaky hands or the device being operated in a moving vehicle. Probabilistic point tracking methods typically use the state space approach to model object properties such as position, velocity, and acceleration and take into account measurement uncertainties in the modeling. Probabilistic approaches can include Kalman filtering, extended Kalman filtering, particle filtering, among others. In Kalman filtering, the state of a linear system can be estimated based on a Gaussian distribution of the state. Kalman filtering can comprise two steps—prediction and correction. The prediction step may use the state model to predict the new state of the parameters of the model:

$$\overline{X}^t = \vec{D} X^{t-1} + W,$$

$$\overline{\Sigma}^t = \vec{D} \Sigma^{t-1} \vec{D}^T + Q^t,$$

where $\overline{X}^t$ is the state prediction at time t, $\overline{\Sigma}^t$ is the covariance prediction at time t, $\vec{D}$ is the state transition matrix correlating the relationship between the state parameters at time t and t−1, Q is covariance of the noise W. In the correction step, the current measurement Zt can be used to update the object's state:

$$K^t = \overline{\Sigma}^t \overline{M}^T \left[ \overline{M} \overline{\Sigma}^t \overline{M}^T + R^t \right]^{-1},$$

$$X_t = \overline{X}^t + K^t \underbrace{\left[ R^t - \overline{M} \vec{X}^t \right]}_{v},$$

$$\Sigma^t = \overline{\Sigma}^t - K^t \overline{M} - K^t \overline{M} \overline{\Sigma}^t,$$

where v is referred to as the innovation, $\vec{M}$ is the measurement matrix, K is the Kalman gain (also referred to as the Riccati equation) used for propagation of the state model. When the system is nonlinear, a Taylor series expansion can be used to extend the Kalman filter.

In particle filtering, the state of the object can be modeled as a sampling probability instead of as a Gaussian distribution. Particle filtering models the conditional state density $P(X_t|Z_t)$ at time t as a set of samples or particles $\{s_t^n : n = 1, \ldots, N\}$ with sampling probability or weights $\pi_t^n$. The weights can be used to characterize the importance of a particular sample or particle. A common sampling technique is importance sampling, which includes selection of N random samples $\hat{s}_t^n$ from $\vec{S}_{t-1}$ by generating a random number r between 0 and 1 and finding the smallest j such that $c_{t-1}^{j-1} > r$ and setting $\hat{s}_t^n = \hat{s}_{t-1}^j$. In the prediction step, for each selected a new sample is generated by:

$$s_t^n = f(\hat{s}_t^n, \vec{W}_t^n),$$

where $\vec{W}_t^n$ is a zero mean Gaussian error and f is a non-negative function, i.e., f(s)=s. In the correction step, weights $\pi_t^n$ corresponding to the new samples $s_t^n$ are calculated using the measurements $z_t$ by:

$$\pi_t^n = p(z_t | x_t = s_t^n),$$

where p can be modeled as a Gaussian density. Using the new samples $\vec{S}_t$, the new position of the object can be estimated using:

$$\epsilon_t = \Sigma_{n=1}^N \pi_t^n f(s_t^n, \vec{W}).$$

Figure 4C:
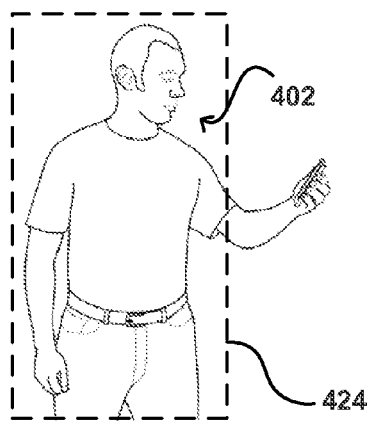
Figure 4D:
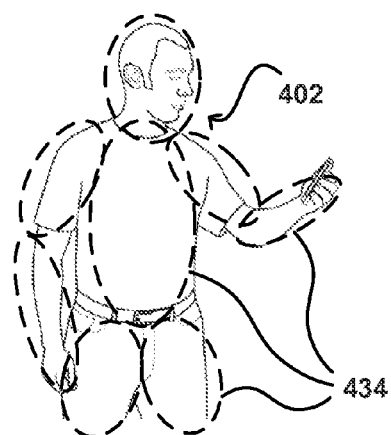

In at least some embodiments, one or more kernel tracking processes can be used as part of the comprehensive object tracking process. As used herein, "kernel" refers to a primitive shape and/or appearance of an object. FIGS. 4C and 4D illustrate example approaches of kernel-based tracking that can be used to track an object of interest in accordance with various embodiments. FIG. 4C illustrates an example kernel-based approach for tracking an object of interest, user 402, as a rectangle 424. A kernel representing the user 402 can include the rectangle 424 and an associated histogram. In other embodiments using a similar approach, other primitive geometric shapes can be used, such as ellipses (or ellipsoids or cylinders for 3-D representations), triangles, or hexagons. FIG. 4D illustrates another example approach for kernel-based tracking of an object of interest, user 402, as an articulated shape model comprising ellipses 434 connected at joints, such as the head, torso, upper arms, lower arms, and upper legs of the user. As with single shape representations of an object, other primitive 2-D and 3-D geometric shapes can also be used to represent the object.

Kernel-based tracking methods determine the motion of the object of interest from image to image, and can include simple template matching, optical flow analysis, multiview appearance modeling, among others. In simple template matching, a brute force approach can be used to search an image or frame for a region similar to a template of the object of interest defined in a previous image or frame. The position of the template in the current image or frame is determined by a similarity measure, such as a maximum of the cross-correlation or normalized cross-correlation or a minimum of a criterion, such as the mean squared error, mean absolute difference, or the number of threshold differences. Templates can include information regarding image intensity, color features, surface radiance, or image gradients of the object of interest. A template can also include color histograms or mixture models of the pixels of a primitive geometric bounding the object (e.g., rectangle, ellipse, circle, ellipsoid, cylinder, etc.). In some embodiments, other tracking approaches can be used instead of a brute force search, such as mean-shift tracking or the approach of Jepson. In Jepson tracking, the object of interest can be represented as a three component mixture comprising stable appearance features of the object, transient features of the object, and noise. An online version of the expectation maximization (EM) algorithm can be used to determine the parameters of the mixture.

Other kernel-based tracking approaches that can be used to may be based on optical flow. Some optical flow techniques compute motion from spatial and temporal derivatives of image features such as intensities or filtered versions of the image. Such techniques are based on the assumption that all temporal intensity changes are due to motion only. This can be represented by:

$$I(x,y,t)=I(x+dx,y+dy,t+dt),$$

where I(x, y, t) is a center pixel in a n×n neighborhood of pixels and moves by dx, dy in time dt. For small displacements, a linearized Taylor series expansion yields the motion constraint equation:

$$\nabla I \cdot \vec{v} = -I_t,$$

where $\nabla I = (I_x, I_y)$ is the spatial intensity gradient and $\vec{v} = (v_x, v_y)$ is the image velocity or optical flow at pixel (x, y) at time t. The motion constraint equation is an ill-posed problem in that it yields one equation and two unknowns. This is a mathematical consequence of the aperture problem, wherein there may be insufficient local image intensity structure to measure full image velocity. A typical way to overcome the ill-posedness problems of differential methods is to use smoothing techniques and smoothness assumptions prior to differentiation to remove noise and to stabilize the differentiation process. Local differential methods use spatial constancy assumptions while global differential techniques supplement the motion constraint with a regularizing smoothness term.

In various embodiments, local approaches based on the Lucas-Kanade optical flow algorithm can be used to track an object of interest. The algorithm is set forth in Lucas, Bruce D. et al. "An iterative image registration technique with an application to stereo vision." *In Proceedings of the 7th international joint conference on Artificial intelligence*. 1981, and is incorporated herein by reference. The Lucas-Kanade algorithm estimates displacement of a neighborhood of pixels by analyzing changes in pixel intensity from the known intensity gradients of the image in that neighborhood. As mentioned, for a simple pixel, there are two unknowns and one equation, such that the system is ill-posed or under-determined. Therefore, a neighborhood of pixels is used to derive additional equations to make the system over-determined. The system can then be solved using a least squares solution that averages the motion vectors over the neighborhood. The Lucas-Kanade method attempts to minimize:

$$\sum_{x,y \in \Omega} W^2(x,y)[\nabla I(x,y,t) \cdot \vec{v} + I_t(x,y,t)]^2,$$

where W(x,y) is a windowing function that gives more influence to constraints at the center of the neighborhood than those at the periphery. The result of the Lucas-Kanade algorithm is a set of motion vectors distributed over the image estimating movement of objects in the scene.

In other embodiments, a global approach, such as the Horn-Schunk algorithm or a variation thereof, can be used to track an object of interest. The Horn-Schunk algorithm is set forth in Horn, Berthold K P et al. "Determining optical flow." *Artificial intelligence* 17, no. 1 (1981): 185-203, which is incorporated herein by reference. Horn-Schunk uses a global regularization calculation as a constraint. Horn-Schunk assumes that images consist of objects that undergo rigid motion such that motion will be smooth over relatively large areas of the image. The Horn-Schunk algorithm attempts to minimize:

$$\int_D (\nabla I \cdot \vec{v} + I_t)^2 + \lambda^2 \left[ \left(\frac{dv_x}{dx}\right)^2 + \left(\frac{dv_x}{dy}\right)^2 + \left(\frac{dv_y}{dx}\right)^2 + \left(\frac{dv_y}{dy}\right)^2 \right] dxdy$$

defined over the image domain D, where the magnitude of λ corresponds to the influence of the smoothness term.

In template-based matching and optical flow analysis, the kernels are usually generated online and represent the information gathered about the object from the most recent observations. However, the appearance of an object of interest may differ according to the perspectives of the camera(s) used to capture image data of the object, and if the view of the object changes significantly during tracking, the kernel may no longer be valid and tracking will fail. Thus, in some embodiments, different perspectives of the object can be learned offline and used for tracking in multiview appearance modeling. Kernel-based tracking based on multiview appearance modeling can include PCA and SVM, which are discussed elsewhere herein.

Figure 4E:
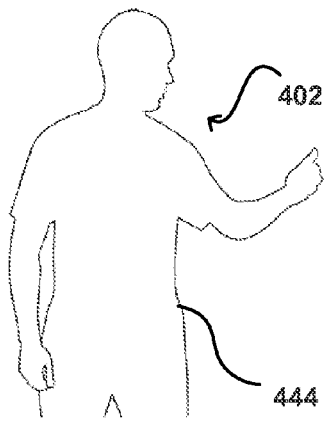
Figure 4F:
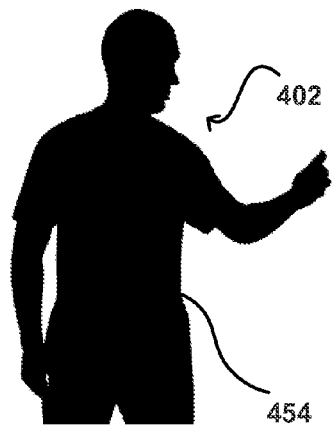

Objects of interest can have complex shapes that may not be accurately represented as primitive geometric shapes. For example, the hands or head of a user cannot be circumscribed precisely by simple geometric shapes. Thus, in at least some embodiments, one or more silhouette or contour tracking processes can be used as part of a comprehensive object tracking process. FIGS. 4E and 4F illustrate example approaches of contour or silhouette-based tracking that can be used to track an object of interest in accordance with various embodiments. FIG. 4E illustrates an approach of tracking an object based on the contours 444 of an object of interest, user 402, defined by the boundaries of the user. Other contour representations of an object may comprise of points at the boundaries of the object instead of edges. The region inside the contours of an object is sometimes referred to as the "silhouette," which can also be used to represent an object of interest in some embodiments. FIG. 4F illustrates an approach of tracking an object of interest, user 402, based on a silhouette 454 of the user.

In contour-based tracking approaches, an initial contour of the object is evolved to its new position in a current image or frame. Tracking an object of interest by evolving a contour of the object can be performed using a state model of the contour shape and motion or minimizing the contour energy using direct minimization techniques. In the contour shape and motion modeling approach, the state of the model can be updated at each time instant such that the contour's a posteriori probability is maximized. The posterior probability depends on the prior state and the current likelihood which is typically defined in terms of the distance of the contour from observed edges. Kalman filtering or particle filtering, which are discussed elsewhere herein, can be used to predict new states of the object contour and update the states of the object contour. In energy-based contour tracking, the energy of the contour can be minimized using greedy methods or by gradient descent. The contour energy can be defined in terms of temporal information in the form of optical flow fields or appearance statistics generated from the object and the background regions.

In silhouette-based tracking methods, the object silhouette can be searched for image to image. Such approaches are similar to approaches for template matching in that the search for an object silhouette and its associated model in a current image is performed by determining the similarity of the object of interest with the model generated from the hypothesized object silhouette based on a previous image. Silhouette tracking approaches can also be determined based on identifying the flow fields for each pixel inside the object silhouette that is dominant over the entire object silhouette.

In various embodiments, multiple object tracking processes can provide a respective estimated position of the object of the interest and a level of confidence, error rate, receiving operating characteristics (ROC), or similar metrics associated with the respective estimated position. These results can be combined in various ways, including rule-based approaches, classification-based approaches, or estimation-based approaches. Rule-based approaches can include a variety of basic rules, such as maximum/minimum, median, mean, or majority rules for determining a current position of an object of interest from multiple estimated positions provided respectively by the multiple tracking processes. An example of a maximum rule may be based on selection of the results of the tracking process having the highest level of confidence. An example of a minimum rule may be based on selection of the results of the tracking process having the lowest error rate. Examples of the median and mean rules may involve averaging the results of the multiple tracking processes. An example of a majority rule may provide a "vote" to each of the object tracking processes, and an estimated position can be determined based on the majority of the results of the multiple object tracking processes. For embodiments using the maximum, minimum, median, mean, majority rules, among others, the results of the tracking processes can be weighted based on a number of factors such as the respective level of confidence, error, ROC, or similar metric associated with each tracking process. In some embodiments, weighting may be additionally or alternatively based on the amount of time that a particular tracking process takes on average or the amount of memory, processing, power, and other resources required by the tracking process.

In other embodiments, determination of a position of an object of interest from multiple tracking processes may be based on classification approaches or estimation approaches. Classification approaches can be based on support vector machines, Bayesian inference, Dempster-Shafer theory, hidden Markov models, neural networks, and maximum entropy models. Estimation-based approaches can include the Kalman filter or its variants, such as the extended Kalman filter or the unscented Kalman filter, and the particle filter. Such approaches are discussed elsewhere herein.

Object tracking can enable users to interface with computing devices in various ways. In some embodiments, object tracking can be used by a computing device to recognize certain head and facial gestures, such as head nods or rolls, eye winks or other ocular motion, or lip movement as input to the device to perform tasks upon recognition of the gestures. Object tracking can also streamline video conferencing by detecting, tracking, and transmitting user movement (e.g., facial expressions, hand waves) and rendering video from models of the video conference participants and the tracked user movement instead of capturing and streaming video. Object tracking for video conferencing is discussed in co-pending U.S. patent application Ser. No. 13/797,394, filed Mar. 12, 2013, entitled "Rendered Audiovisual Communication," which is incorporated by reference herein. Virtual and augmented reality applications can also depend on head pose estimation to correctly render image or video data according to the current perspective of the user. Gaze estimation can be enhanced when the position and orientation of the user's head or face is known. Speech recognition can be made more robust by monitoring user lip movement in conjunction with analysis of audio data. Certain stereographic displays may also depend upon head pose and/or gaze estimation.

In some embodiments, motion or orientation data captured by sensors such as accelerometers, gyroscopes, inclinometers, magnetometers, and others, can be used to improve performance of one or more of the multiple object tracking processes. For example, the relative position and orientation of a computing device can be derived from motion and/or orientation sensor data when a user moves the computing device. Techniques for determining the position and orientation of a computing device from such sensor data is well known in the art and will not be discussed herein detail. The position and orientation obtained from the motion and orientation sensors can be used to focus on one or more regions of an image to be analyzed by an object tracking process, which can optimize the tracking process by circumscribing the region of the image needed to be searched by the tracking process. Certain tracking processes may be based on tracking a single object until achieving a a threshold level of confidence. Computation time can be saved for such processes by initializing such tracking processes to begin searching for the object of interest at an expected position in the image based on the motion and determination sensor data.

In some embodiments, an ambient light sensor can be used to improve performance of one or more of the multiple object tracking processes. For instance, certain object tracking processes may be more sensitive to changes in illumination than other object tracking processes. When the amount of light determined by the ambient light sensor is determined to meet or exceed a threshold value, illumination-sensitive tracking processes can be selected as part of the comprehensive object tracking process and/or the illumination-sensitive tracking processes can be weighted greater based on illumination conditions. Alternatively, when the amount of ambient light of the current environment is below a threshold value, illumination-sensitive tracking processes may be excluded from the comprehensive object tracking process or such processes can be weighted less.

In some embodiments, a proximity sensor, depth sensor, distance sensor, structured lighting transceiver, and the like can be used to improve the robustness of one or more of the multiple object tracking processes. For example, certain tracking processes capable of tracking an object in three-dimensional space can be more accurate with the distance or depth information provided by the proximity sensor, depth sensor, distance sensor, or structured lighting transceiver.

Figure 5:
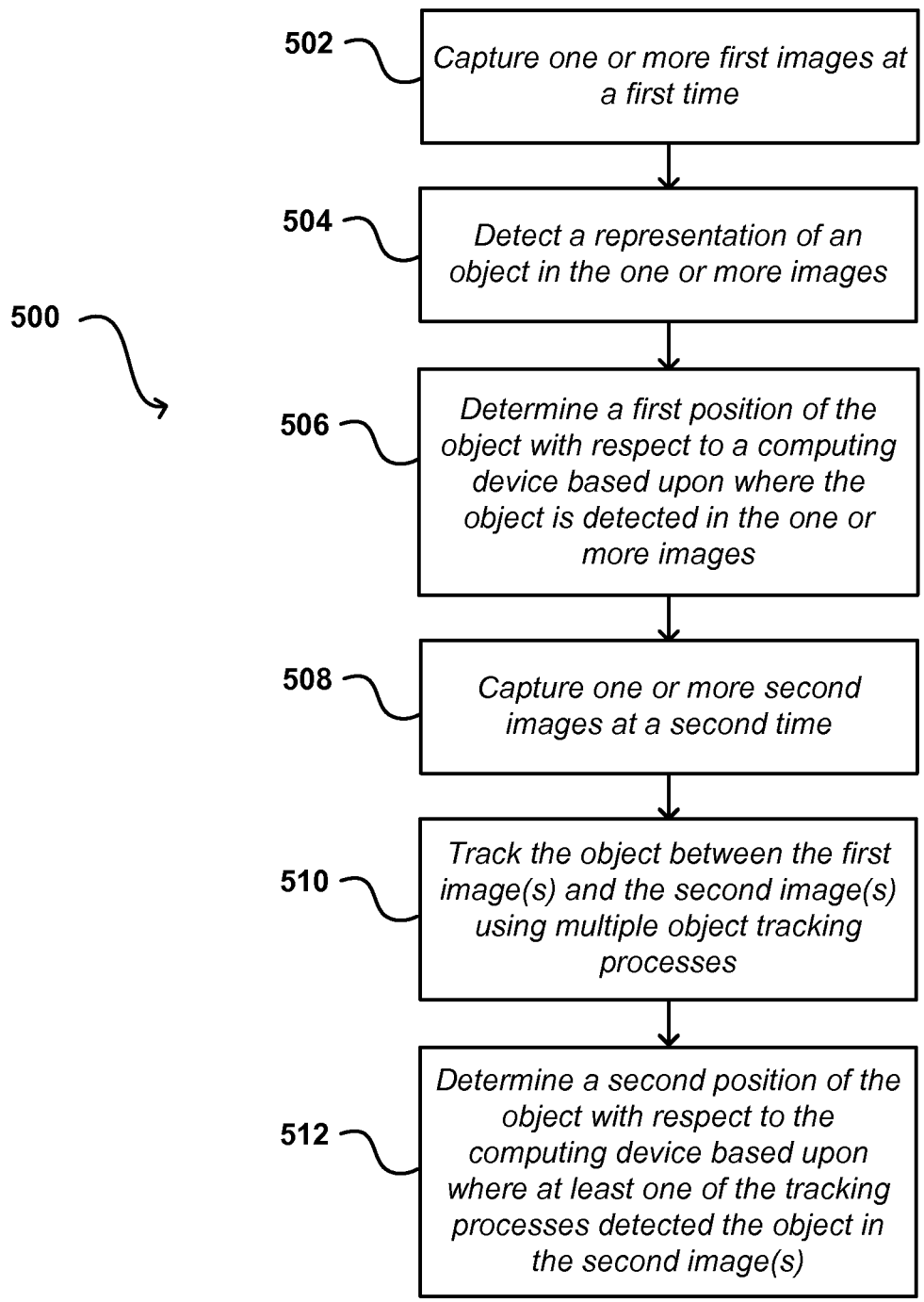
FIG. 5 illustrates an example process for detecting and tracking an object of interest in accordance with an embodiment.

FIG. 5 illustrates an example process 500 for tracking an object of interest in accordance with an embodiment. It should be understood that, for any process discussed herein, there can be additional, fewer, or alternative steps performed in similar or alternative orders, or in parallel, within the scope of the various embodiments unless otherwise stated. The example 500 process may begin by capturing one or more first images at a first time 502 (or substantially at a first time if multiple cameras are used and the cameras are not synced). In at least some embodiments, the one or more images can be pre-processed to improve object detection and tracking. Pre-processing can include deblurring, reduction or removal of noise (e.g., dark-current shot noise, photon shot noise, fixed pattern noise, bias noise, and quantization noise), reduction or removal of specular reflection, histogram equalization or optimization, brightness and contrast optimization, color-cast correction, and other image optimization or enhancement techniques known to those of ordinary skill in the art. Approaches for deblurring an image can include inverse filtering, Wiener filtering, the Richardson-Lucy method, among others. Inverse filtering is based on the premise that convolutions in the spatial domain become pixel-by-pixel multiplications in the frequency domain:

$$g = h \otimes f \overset{(**)}{\Longleftrightarrow} G = H \cdot F,$$

where G and F are Fourier transforms of the images g and f, respectively, and H is the Fourier transform of the point spread function (PSF) or convolution kernel. Knowing the PSF or convolution kernel h and the blurred image g, g can be deblurred to obtain image f by:

$$f = \mathcal{F}^{-1}\left(\frac{\mathcal{F}(g)}{\mathcal{F}(h)}\right),$$

where $\mathcal{F}$ is the discrete Fourier transform, $\mathcal{F}^{-1}$ is the inverse discrete Fourier transform, and $$\frac{\mathcal{F}(g)}{\mathcal{F}(h)}$$

represents the pixel-by-pixel division. Wiener filtering attempts to address the noise problems inherent in deconvolution. It works in the frequency domain, and tries to minimize the impact of deconvoluted noise at frequencies which have poor signal-to-noise ratio. A simplified version of the Wiener filter may be defined as:

$$\tilde{f} = \mathcal{F}^{-1}\left(\frac{H^2}{H^2 + k} \cdot \frac{H \cdot F + N}{\mathcal{F}(h)H}\right),$$

where k is non-negative constant added to every pixel of the squared transformed convolution kernel. The greater the value of k, the more noise is suppressed. However, a greater value of k may also result in poor deblurring.

The Richardson-Lucy (R-L) technique is an iterative method that computes a sequence of images which converge to the desired, deblurred image. R-L begins by estimating a first approximation of the deblurred image. The approximation is refined at each iteration using a correction factor based on the ratio between the blurred image and the approximation. R-L is defined as:

$$\text{(first approximation)} \quad \forall y, x : \tilde{f}_0(y, x) := c, \quad c \in \mathbb{R}_+ \setminus \{0\}$$

$$\text{(R-L iteration)} \quad \tilde{f}_{n+1} = \tilde{f}_n \cdot \left(h \otimes \frac{g}{h \otimes \tilde{f}_n}\right), \quad n > 0$$

In some embodiments, denoising techniques may also be applied on an image. For example, cameras can be subject to a variety of noise, including dark-current shot noise, photon shot noise, fixed pattern noise, bias noise, quantization noise, etc. These effects can differ from camera to camera as well as from pixel to pixel in the same camera. In some embodiments, an electronic device can be calibrated to measure the data associated with each of these conditions. For instance, bias is an offset can occur when a pixel is read from a camera. A camera can be calibrated to eliminate (or at least substantially reduce) bias noise by subtracting "a bias noise compensation image" from an image captured at a particular exposure setting. A bias noise compensation image can be generated for each exposure setting of a camera by taking the average or the median of a series of zero-length exposures (or as close as possible to zero length) with the shutter closed for the corresponding exposure setting.

Dark noise can be the result of the gradual accumulation of dark current in the pixels of an image sensor during an exposure. The accumulation of dark current is related to the temperature of the image sensor. For example, an increase in temperature of six to ten degrees Celsius can double the amount of dark noise for certain cameras. Dark current can accumulate at a different rate in every pixel of a camera, and a camera can be calibrated to compensate for dark noise in various ways. One approach is to generate a "dark noise compensation image" corresponding to the same exposure time and temperature as a captured image, with the shutter closed. Alternatively, a "master dark noise compensation image," comprising the average or median of several dark noise compensation images, such as 10 to 20 dark noise compensation images, under the same exposure time and temperature as the captured image can be used in this approach. Another technique for dark noise calibration is to generate "scaled dark noise compensation images" prior to image capturing. Scaled dark noise compensation images comprise master dark noise compensation images obtained at a set of specified temperatures for a set of exposure settings. Master dark noise compensation images, using this technique, can be created by subtracting a bias noise compensation image from each dark noise compensation image and taking the average or median of the dark noise compensation images. Bias noise compensation images can be applied to captured images, and the master dark noise compensation image corresponding to a specified temperature and exposure setting can be applied to scale the master dark noise compensation image to the time of the captured image. Other approaches for calibrating an electronic device for image capture are discussed in co-pending U.S. patent application Ser. No. 13/829,147, filed Mar. 14, 2013, entitled "Approaches for Creating High Quality Images," which is hereby incorporated by reference herein.

Specular reflection can affect the quality of images captured by an electronic device. For example, if an object of interest being imaged is at least somewhat glossy, the object can reflect a significant portion of light along one or more angles, depending upon factors such as the shape of the object and the relative position of each nearby light source. If the direction in which light from a light source is reflected happens to coincide with at least a portion of a field of view of a camera, at least a portion of the scene might be saturated by the light such that any information about an object of interest at that location is lost. Even in situations where the scene is not saturated, the amount of light reflected can dominate a portion of the field of view such that it is difficult to extract any useful information about the object of interest. Thus, in at least some embodiments, the computing device can detect a specular reflection, amount of saturation, or other measure of excessive intensity incident of at least a portion of a field of view of a camera, and remove such image distortions. Approaches for removing specular reflection and the like are discussed in co-pending U.S. patent application Ser. No. 13/829,147, filed Sep. 24, 2012, entitled "Reducing Specular Reflection Effects for Image Processing," which is hereby incorporated by reference herein.

Other image enhancement techniques that can be performed on images may include histogram optimization, brightness and contrast optimization, and/or color-cast correction. Images can be represented according to an eight-bit dynamic range, i.e., there are $2^8=256$ possible brightness values, with zero being black and 255 being white. Color images can additionally or alternatively have three arrays of numbers typically representing red, green, and blue (RGB) images that are combined to give the full spectrum of colors. Many image enhancement techniques involve the use of the histogram of an image, which can be created by counting the number of times each brightness value (and/or RGB value) occurs in the image, then dividing by the total number of pixels in the image to create a distribution of the percentage of each brightness value (and/or RGB value) in the image. The histogram thus can describe the statistical distribution in brightness values (and/or RGB values) in the image. An image can be enhanced in various ways by remapping the original brightness values (and/or RGB values) to different brightness values (and/or RGB values).

Contrast enhancements can improve the perceptibility of objects of interest in a scene by enhancing the brightness difference between the objects and their backgrounds. Cameras are generally designed to record a wide range of brightness values but few scenes utilize the full sensitivity range of these sensors. To produce an image with an optimum contrast ratio, approaches such as linear contrast stretch, nonlinear contrast stretch, or Gaussian stretch can be performed on one or more output frames. A linear contrast stretch typically operates by remapping the low end of the original histogram to black and the high end to white and the remaining pixel values in between are distributed linearly between these extremes. The linear contrast stretch can improve the contrast of most of the original brightness values, but there may be a loss of contrast at the extreme high and low end of the image. The nonlinear contrast enhancement typically operates by redistributing a histogram by applying the greatest contrast enhancement to the most populated range of brightness values in the original image, which can result in maximum contrast. A Gaussian stretch is a nonlinear stretch that enhances contrast within the tails of the histogram. This can improve contrast in the light and dark ranges of the image, but may come at the expense of contrast in the middle gray range.

The color of an image can be represented in various ways, including the aforementioned RGB system or the intensity, hue, and saturation (IHS) system. The IHS system is based on the color sphere in which the vertical axis represents intensity, the radius corresponds to saturation, and the circumference corresponds to hue. The intensity (I) axis represents brightness variations and can range from black (0) to white (255). The hue (H) axis represents the color wavelength and ranges from 0 at the midpoint of red tones and increases counter-clockwise around the circumference of the sphere to conclude with 255. The saturation (S) axis represents the purity of color and ranges from impure (0) at the center of the color sphere to pure (255) at the circumference. A typical color enhancement can include converting the color of an image from the RGB system into the IHS system and performing a linear contrast stretch on the saturation axis.

In some embodiments that employ multiple cameras, the images can be further pre-processed according to a stereoscopic technique to determine depth or distance information and/or a mosaicking technique to cover a larger scene than capable of being captured by a single camera.

The example process 500 may continue by detecting a representation of the object of interest in the one or more images 504 using one or more object detection processes, such as based on feature detection, background subtraction, segmentation, supervised learning, among others, as discussed elsewhere herein. A first position of the detected object can then be determined 506 based upon where the representation of the object of interest is detected in the one or more images. Depending on the application, the position of the object of interest can be represented in various ways. In some embodiments, the determined position can be represented as the raw pixel coordinates of the representation of the object of interest detected in the images. For example, in a gesture recognition application (e.g., head gestures or hand/finger gestures), the position of the object of interest as represented in pixel coordinates in images may be tracked over a period of time to derive motion of the object of interest. The motion of the object of interest may then be compared to a gesture "dictionary" to determine whether the motion correlates to a particular gesture.

In other embodiments, the position of the object of interest can be computed with respect to the device used to capture the representation of the object of interest. For instance, an application for object tracking is to simulate a three-dimensional environment on a two-dimensional display screen of a computing device. The user can be tracked such that the contents displayed on the display screen are rendered according to a three-dimensional perspective corresponding to the user's position with respect to the device. For example, a rightward tilt of the user's head or a rightward tilt of the device may cause the left-facing portions of one or more three dimensional graphical elements to be displayed more prominently, as in the example of FIG. 1F. Other techniques can include defining a fixed light source for the display and altering the shadowing of graphical elements based on motion relative to the light source. Approaches for rendering a three-dimensional perspective of graphical elements for a two-dimensional display are discussed in co-pending U.S. patent application Ser. No. 13/209,243, entitled, "Simulating Three-Dimensional Features," filed Aug. 11, 2012, which is incorporated herein by reference. In one embodiment, a three-dimensional vector can be defined between a first point corresponding to a device, such as the center of a display screen of the device, and a second point corresponding to a user, such as a point between the user's eyes. Determining the position of the object of interest can include computing the values of this vector as the user's head, face, and/or eyes move with respect to the device (or the device is moved with respect to the user).

In other embodiments, more robust position information can be obtained by analyzing multiple images from multiple cameras captured at the same time or substantially at the same time in a process referred to as reconstruction. When there are two images or a stereo pair of images, the reconstruction process may include finding a plurality of corresponding points between two images, determining the fundamental matrix from the corresponding points, determining the camera matrices from the fundamental matrix, triangulation of the 3D points that project to the corresponding 2D points in the two images, and rectifying the projective reconstruction to metric. Variations on this approach are possible, such as where the cameras are calibrated. Approaches for camera calibration include the direct linear transformation (DLT) method, or the algorithm set forth in Tsai, Roger. "A versatile camera calibration technique for high-accuracy 3D machine vision metrology using off-the-shelf TV cameras and lenses." *Robotics and Automation, IEEE Journal of* 3, no. 4 (1987): 323-344, or the algorithm set forth in Zhang, Zhengyou. "A flexible new technique for camera calibration." *Pattern Analysis and Machine Intelligence, IEEE Transactions on* 22, no. 11 (2000): 1330-1334, each of which is incorporated herein by reference. In the case where the cameras are calibrated, the essential matrix can be computed instead of the fundamental matrix, and determining the camera matrices is unnecessary. Further, information about the motion of the camera, scene constraints, or partial camera calibration can be used to refine the reconstruction process.

Corresponding points between two images involves feature matching between the two images, which is discussed elsewhere herein. The fundamental matrix is a mapping from the two-dimensional projective plane of the first image to the pencil of epipolar lines through the epipole $\vec{e'}$. The fundamental matrix is defined as the matrix F that satisfies the condition:

$$x_i'^T F x_i = 0,$$

where $x_i \leftrightarrow x_i'$ are the set of corresponding points in the two images for all i. Approaches for determining the fundamental matrix include the seven-point correspondences algorithm, the normalized eight-point algorithm, the algebraic minimization algorithm, minimization of epipolar distance, minimization of symmetric epipolar distance, the maximum likelihood (Gold Standard) method, random sample consensus (RANSAC), least median of squares, among others. In some embodiments, the essential matrix may be calculated if the camera calibration matrices are known. The camera matrices P and P' corresponding to the fundamental matrix F can be computed using:

$$P=[I|\vec{0}]P'=[[\vec{e'}]_\times F|\vec{e'}],$$

where I is the 3×3 identity, $\vec{0}$ is a null 3-vector, $\vec{e'}$ is the epipole such that $\vec{e'}^T F=\vec{0}$.

Triangulation computes the 3D point that projects to each point correspondence $x_i \leftrightarrow x_i'$. Approaches for triangulation include linear methods, the optimal triangulation method, among others. Rectifying the projective reconstruction to metric can be implemented directly, such as by computing the homography H such that $X_{Ei}=HX_i$ for five or more ground control points $X_{Ei}$ with known Euclidean positions.

Another approach for rectifying the projective reconstruction is referred to as the stratified method, which may involve an affine reconstruction and a metric reconstruction. The affine reconstruction includes computing the plane at infinity, $\pi_\infty$, and upgrading the projective reconstruction to an affine reconstruction with the homography:

$$H = \begin{bmatrix} I & | & 0 \\ & \pi_\infty^T & \end{bmatrix}$$

The metric reconstruction may include computation of the absolute conic, $\omega$, and then upgrading the affine reconstruction with the homography:

$$H = \begin{bmatrix} A^{-1} & \\ & 1 \end{bmatrix},$$

where A is obtained by Cholesky factorization from the equation $AA^T=(M^T \omega M)^{-1}$, and M is the first 3×3 submatrix of the camera in the affine reconstruction for which $\omega$ is computed. One of ordinary skill in the art will appreciate that other embodiments may reconstruct 3D points from multiple 2D images, such as approaches based on calculating the trifocal tensor for three images or techniques based on factorization algorithm or bundle adjustment for n images. These various approaches for reconstruction are discussed in Hartley, Richard et al. *Multiple view geometry in computer vision.* Vol. 2. Cambridge, 2000, which is hereby incorporated herein by reference.

The example process 500 may continue by capturing a second set of one or more images at a second time 508 (or substantially at the same time if multiple cameras are used and the cameras are not synced). The object of interest can be tracked between where the object was detected in the first images and where the object is tracked in the second images using multiple object tracking processes 510, such as the techniques based on objection detection (e.g., feature detection, background subtraction, segmentation, supervised learning), point tracking, kernel tracking, template tracking, among others, as discussed elsewhere herein. A second position of the representation of the object can then be determined based at least in part on one of the tracked locations 512 using an approach discussed above with respect to step 506. As discussed, the second position of the object of interest can be selected from the results of the best performing tracker under certain heuristics or the results of the multiple tracking processes can be combined using rule-based methods, classification-based methods, or estimation-based methods.

In some embodiments, a change between the first position and the second position can be compared to a threshold value. If the change in location is greater than the threshold value, a user interface of the computing device can be modified based on the change in position of the object of interest. In some embodiments, a computing device may display three-dimensional content that can be rendered based on the change in position of the user as discussed elsewhere herein. In some embodiments, object tracking can be used for enhancing accessibility and/or providing a hands-free experience. For example, non-traditional user gestures such as head nods, eye winks, or nose scrunches can be tracked as input to a computing device. As another example, object tracking, such as head or face tracking, can be used to automatically adjust the orientation of the content being displayed on a computing device without manual intervention by the user. For instance, a user may lay the computing device on a flat surface while situated at a first position and then change positions approximately 90°, 180°, or 270° from the first position. The orientation of the content being displayed on the computing device will change without reliance on motion or determination sensors. In another embodiment, object tracking (e.g., user's eyes, mouth, hands) can also be used to control media playback. For example, a video or other media content may be paused if the user is not detected for an extended period of time or the user may make a finger gesture in the air to fast-forward media content by spinning her finger in a clockwise motion and rewinding content by spinning her finger in a counter-clockwise motion. In some embodiments, object tracking may be used for facial expression recognition for determining an emotional state of a user or provide input to a model for rendering visual data of the user. Object tracking can also be used in virtual or augmented reality applications such as virtual shopping. For example, a user can virtually try on clothing to determine whether to make an online purchase. Object tracking can also be leveraged for privacy or security purposes, such as applications that require a "live" face, eyes, irises, etc., for biometric validation. Object tracking can be used to supplement or enhance various other applications, such as lip reading to supplement speech-to-text conversion. Other approaches and applications can be utilized as well as should be apparent to one of ordinary skill in light of the teachings and suggestions contained herein.

Figure 6:
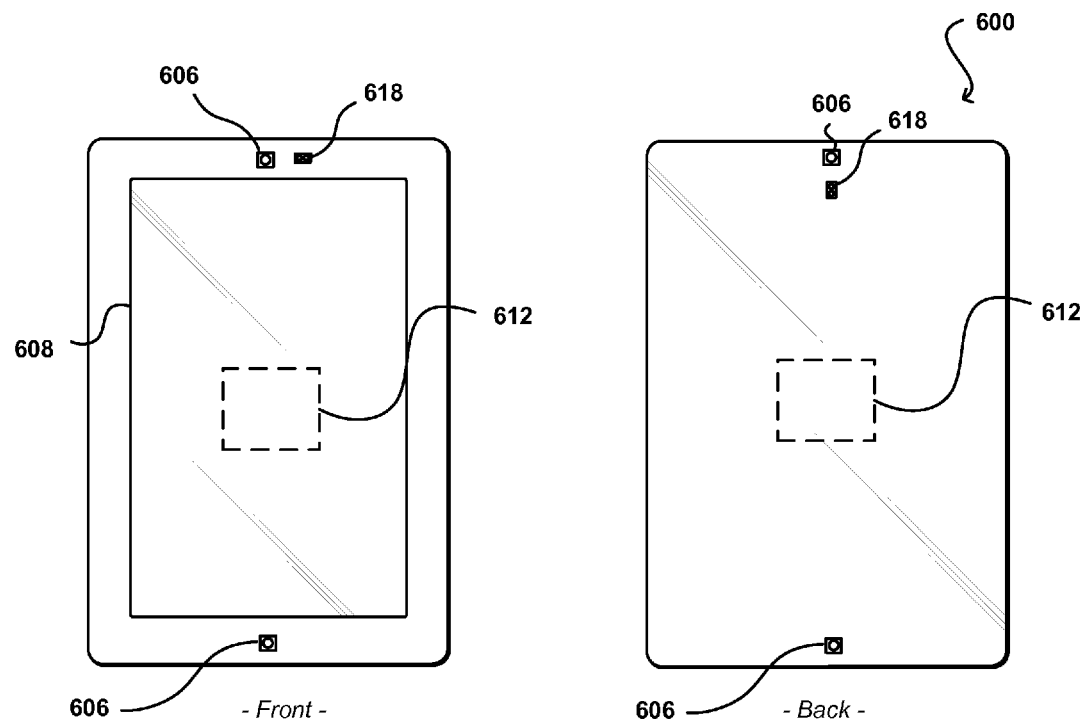
FIG. 6 illustrates an example of a computing device that can be used in accordance with various embodiments.

FIG. 6 illustrates an example computing device 600 that can be used to perform approaches described in accordance with various embodiments. In this example, the device includes two cameras 606 located at the top and bottom on each of a same and opposite side of the device as a display element 608, and enabling the device to capture images in accordance with various embodiments. The computing device also includes a depth imaging system 618 on each side of the device, such as an IR system including one or more IR emitters and one or more IR sensors to determine depth or distance information during image capturing according to certain embodiments. The computing device also includes an inertial measurement unit (IMU) 612, comprising a three-axis gyroscope, three-axis accelerometer, and magnetometer that can be used to detect the motion of the device, from which position and/or orientation information can be derived.

Figure 7:
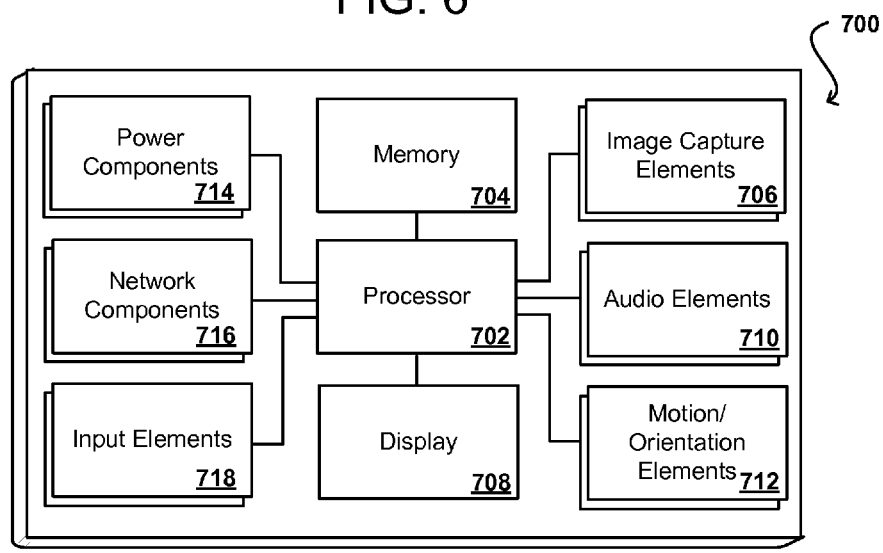
FIG. 7 illustrates an example configuration of components of a computing device such as that illustrated in FIG. 6.

FIG. 7 illustrates a logical arrangement of a set of general components of an example computing device 700 such as the device 600 described with respect to FIG. 7. In this example, the device includes a processor 702 for executing instructions that can be stored in a memory device or element 704. As would be apparent to one of ordinary skill in the art, the device can include many types of memory, data storage, or non-transitory computer-readable storage media, such as a first data storage for program instructions for execution by the processor 702, a separate storage for images or data, a removable memory for sharing information with other devices, etc. The device typically will include some type of display element 708, such as a touchscreen, electronic ink (e-ink), organic light emitting diode (OLED), liquid crystal display (LCD), etc., although devices such as portable media players might convey information via other means, such as through audio speakers. In at least some embodiments, the display screen provides for touch or swipe-based input using, for example, capacitive or resistive touch technology. As discussed, the device in many embodiments will include one or more cameras or image sensors 706 for capturing image or video content. A camera can include, or be based at least in part upon any appropriate technology, such as a CCD or CMOS image sensor having a sufficient resolution, focal range, viewable area, to capture an image of the user when the user is operating the device. An image sensor can include a camera or infrared sensor that is able to image projected images or other objects in the vicinity of the device. Methods for capturing images or video using a camera with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device can similarly include at least one audio component, such as a mono or stereo microphone or microphone array, operable to capture audio information from at least one primary direction. A microphone can be a uni- or omni-directional microphone as known for such devices.

The computing device 700 includes at least one capacitive component or other proximity sensor, which can be part of, or separate from, the display assembly. In at least some embodiments the proximity sensor can take the form of a capacitive touch sensor capable of detecting the proximity of a finger or other such object as discussed herein. The computing device also includes various power components 714 known in the art for providing power to a computing device, which can include capacitive charging elements for use with a power pad or similar device. The computing device can include one or more communication elements or networking sub-systems 716, such as a Wi-Fi, Bluetooth, RF, wired, or wireless communication system. The device in many embodiments can communicate with a network, such as the Internet, and may be able to communicate with other such devices. In some embodiments the device can include at least one additional input device 718 able to receive conventional input from a user. This conventional input can include, for example, a push button, touch pad, touchscreen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 700 also can include one or more orientation and/or motion sensors 712. Such sensor(s) can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 702, whereby the device can perform any of a number of actions described or suggested herein.

In some embodiments, the device 700 can include the ability to activate and/or deactivate detection and/or command modes, such as when receiving a command from a user or an application, or retrying to determine an audio input or video input, etc. For example, a device might not attempt to detect or communicate with devices when there is not a user in the room. If a proximity sensor of the device, such as an IR sensor, detects a user entering the room, for instance, the device can activate a detection or control mode such that the device can be ready when needed by the user, but conserve power and resources when a user is not nearby.

In some embodiments, the computing device 700 may include a light-detecting element that is able to determine whether the device is exposed to ambient light or is in relative or complete darkness. Such an element can be beneficial in a number of ways. For example, the light-detecting element can be used to determine when a user is holding the device up to the user's face (causing the light-detecting element to be substantially shielded from the ambient light), which can trigger an action such as the display element to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

In some embodiments, the device 700 can disable features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If speech or voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power. In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the camera and associated image analysis algorithm(s) may be sensitive enough to distinguish between the motion of the device, motion of a user's head, motion of the user's eyes and other such motions, based on the captured images alone. In other embodiments, such as where it may be desirable for an image process to utilize a fairly simple camera and image analysis approach, it can be desirable to include at least one orientation determining element that is able to determine a current orientation of the device. In one example, the one or more orientation and/or motion sensors may comprise a single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using a camera of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

The operating environments can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
   one or more processors;
   one or more cameras; and
   memory including instructions that, upon being executed by the one or more processors, cause the computing device to:
      capture, at a first time, one or more first images using the one or more cameras;
      detect at least one portion of a representation of a face of a user in the one or more first images using a facial detection process;
      capture, at a second time, one or more second images using the one or more cameras;
      track the at least one portion of the representation of the face of the user between the one or more first images and the one or more second images by concurrently executing a plurality of types of object tracking processes, the plurality of types of object tracking processes including two or more of a feature-based tracking process, an elliptical tracking process, a template matching tracking process, an optical flow tracking process, or a silhouette or contour tracking process;
      select an object tracking process from among the plurality of object tracking processes based at least in part upon the object tracking process best satisfying a condition; and
      determine a position of the face of the user based at least in part upon where the selected object tracking process tracked the at least one portion of the representation of the face of the user in the one or more second images.

2. The computing device of claim 1, wherein the condition corresponds to at least one of a highest level of confidence, a lowest error rate, an average corresponding to where the plurality of types of object tracking processes tracked the at least one portion of the representation of the face of the user in the one or more second images, and a consensus corresponding to where a majority of the plurality of types of object tracking processes tracked the at least one portion of the representation of the face of the user in the one or more second images.

3. The computing device of claim 1, further comprising:
   a display screen operable to display content in two dimensions,
   wherein the instructions upon being executed further cause the computing device to:
      determine a first position of the face of the user based at least in part upon where the at least one portion of the representation of the face of the user is detected in the one or more first images;

display a first view of the content on the display screen, the first view of the content including one or more graphical elements rendered according to a first three-dimensional perspective that is based at least in part upon the first position of the face of the user; and display a second view of the content on the display screen, the second view of the content including the one or more graphical elements rendered according to a second three-dimensional perspective that is based at least in part upon the position of the face of the user.

4. A computer-implemented method for tracking an object, comprising:

under control of one or more computer systems configured with executable instructions, obtaining data corresponding to where at least one portion of a representation of the object is located in one or more first images;

obtaining one or more second images, at least one of the second images including the at least one portion of the representation of the object;

tracking the at least one portion of the representation of the object between the one or more first images and the one or more second images by concurrently executing a plurality of types of object tracking processes, the plurality of types of object tracking processes including two or more of a feature-based tracking process, an elliptical tracking process, a template matching tracking process, an optical flow tracking process, or a silhouette or contour tracking process;

selecting an object tracking process from among the plurality of object tracking processes based at least in part upon the object tracking process best satisfying a condition; and determining a position of the object based at least in part upon where the selected object tracking process tracked the at least one portion of the representation of the object in the one or more second images.

5. The computer-implemented method of claim 4, wherein obtaining the data corresponding to where the at least one portion of the representation of the object is located in the one or more first images includes:

obtaining the one or more first images including the at least one portion of the representation of the object;

detecting the at least one portion of the representation of the object in the one or more first images; and providing the data corresponding to where the at least one portion of the representation of the object is located in the one or more first images based upon where the at least one portion of the representation of the object is detected in the one or more first images.

6. The computer-implemented method of claim 4, wherein determining the position of the object includes:

determining a first plurality of points of the at least one portion of the representation the object in the one or more first images respectively corresponding to a second plurality of points of the at least one portion of the representation of the object in the one or more second images;

calculating a fundamental matrix or an essential matrix using the first plurality of points and the second plurality of points; and determining one or more three-dimensional points corresponding to the object by triangulation using a first camera matrix used to capture the one or more first images, a second camera matrix used to capture the one or more second images, the first plurality of points, and the second plurality of points.

7. The computer-implemented method of claim 4, wherein the condition corresponds to at least one of a highest level of confidence, a lowest error rate, an average corresponding to where the plurality of types of object tracking processes tracked the at least one portion of the representation of the object in the one or more second images, and a majority corresponding to where the plurality of types of object tracking processes tracked the at least one portion of the representation of the object in the one or more second images.

8. The computer-implemented method of claim 4, further comprising:

determining at least one of a motion or an orientation corresponding to one or more cameras used to capture the one or more second images; and causing at least one of the plurality of types of object tracking processes to focus on at least one portion of the one or more second images to track the at least one portion of the representation of the object, the at least one portion of the one or more second images corresponding to the at least one of the motion or the orientation.

9. The computer-implemented method of claim 4, further comprising:

determining an amount of ambient light of an environment in which one or more cameras used to capture the one or more second images are situated; and weighting second data corresponding to at least one of the plurality of types of object tracking processes based at least in part upon the amount of ambient light.

10. The computer-implemented method of claim 4, further comprising:

weighting respective data corresponding to each of the plurality of types of object tracking processes, wherein the position of the object is further based at least in part upon each weight of the respective data corresponding to each of the plurality of types of object tracking processes.

11. The computer-implemented method of claim 10, wherein the weight of the respective data corresponding to each of the at least one subset of the plurality of types of object tracking processes is based at least in part upon at least one of a respective level of confidence for each of the at least one subset of the plurality of types of object tracking processes, a respective error rate for each of the at least one subset of the plurality of types of object tracking processes, a respective amount of memory used by each of the at least one subset of the plurality of types of object tracking processes, a respective amount of processing used by each of the at least one subset of the plurality of types of object tracking processes, or a respective amount of power used by each of the at least one subset of the plurality of types of object tracking processes.

12. The computer-implemented method of claim 4, further comprising:

determining a first position of the object based at least in part upon the data corresponding to where the at least one portion of the representation of the object is located in the one or more first images;

displaying a first view of content, the first view of the content including one or more graphical elements rendered according to a first three-dimensional perspective that is based at least in part upon the first position of the object; and displaying a second view of the content, the second view of the content including the one or more graphical elements rendered according to a second three-dimensional perspective that is based at least in part upon the position of the object.

13. The computer-implemented method of claim 4, further comprising:
applying at least one of deblurring, denoising, histogram equalization, brightness optimization, contrast optimization, color-cast correction, or reduction or removal of specular reflection to at least one of the second images.

14. A non-transitory computer-readable storage medium storing instructions for tracking an object, the instructions upon being executed by a processor causing the processor to:
obtain one or more first images, at least one of the first images including at least one portion of a representation of the object;
detect the at least one portion of the representation of the object in the one or more first images;
obtain one or more second images, at least one of the second images including the at least one portion of the representation of the object;
track the at least one portion of the representation of the object between the one or more first images and the one or more second images by concurrently executing a plurality of types of object tracking processes, the plurality of types of object tracking processes including two or more of a feature-based tracking process, an elliptical tracking process, a template matching tracking process, an optical flow tracking process, or a silhouette or contour tracking process;
select an object tracking process from among the plurality of object tracking processes based at least in part upon the object tracking process best satisfying a condition; and
determine a position of the object based at least in part upon where the selected object tracking process tracked the at least one portion of the representation of the object in the one or more second images.

15. The non-transitory computer-readable storage medium of claim 14, wherein the instructions upon being executed further cause the processor to:
determine at least one of a motion or an orientation corresponding to one or more cameras used to capture the one or more second images; and
cause at least one of the plurality of types of object tracking processes to focus on at least one portion of the one or more second images to track the at least one portion of the representation of the object, the at least one portion of the one or more second images corresponding to the at least one of the motion or the orientation.

16. The non-transitory computer-readable storage medium of claim 14, wherein the instructions upon being executed further cause the processor to:
determine an amount of ambient light of an environment in which one or more cameras used to capture the one or more second images are situated; and
weight data corresponding to at least one of the plurality of types of object tracking processes based at least in part upon the amount of ambient light.

17. The non-transitory computer-readable storage medium of claim 14, wherein the condition corresponds to at least one of a highest level of confidence, a lowest error rate, a lowest amount of memory used, a lowest amount of processing used, and a lowest amount of power used.

18. The non-transitory computer-readable storage medium of claim 14, wherein the instructions upon being executed further cause the processor to:
determine a first position of the object based at least in part upon where the at least one portion of the representation of the object is detected in the one or more first images;
display a first view of content including one or more graphical elements rendered according to a first three-dimensional perspective that is based at least in part upon the first position of the object; and
display a second view of the content including the one or more graphical elements rendered according to a second three-dimensional perspective that is based at least in part upon the position of the object.

* * * * *